US012472757B2

(12) United States Patent
Ukai et al.

(10) Patent No.: US 12,472,757 B2
(45) Date of Patent: Nov. 18, 2025

(54) PRINTING CASSETTE HAVING STRUCTURE FOR RESTRAINING POWER TRANSMISSION LOSS, AND PRINTING DEVICE USING THE SAME

(71) Applicant: BROTHER KOGYO KABUSHIKI KAISHA, Nagoya (JP)

(72) Inventors: Shinji Ukai, Kiyosu (JP); Kentaro Murayama, Kasugai (JP); Kosuke Higashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 95 days.

(21) Appl. No.: 18/472,750

(22) Filed: Sep. 22, 2023

(65) Prior Publication Data

US 2024/0010013 A1 Jan. 11, 2024

Related U.S. Application Data

(63) Continuation of application No. PCT/JP2022/011553, filed on Mar. 15, 2022.

(30) Foreign Application Priority Data

Mar. 24, 2021 (JP) ................................ 2021-050350

(51) Int. Cl.
*B41J 15/04* (2006.01)
*B41J 3/407* (2006.01)

(52) U.S. Cl.
CPC ........... *B41J 15/044* (2013.01); *B41J 3/4075* (2013.01)

(58) Field of Classification Search
CPC ........ B41J 15/044; B41J 3/4075; B41J 13/00; B41J 13/0009; B41J 15/00; B41J 15/04; B41J 15/046; B41J 17/32
See application file for complete search history.

(56) References Cited

U.S. PATENT DOCUMENTS 6,042,280 A 3/2000 Yamaguchi et al.
2009/0196669 A1 8/2009 Murata
(Continued)

FOREIGN PATENT DOCUMENTS

CN 106715134 A 5/2017
CN 110936721 A 3/2020
(Continued)

OTHER PUBLICATIONS

International Search Report of the International Searching Authority for PCT/JP2022/011553 (May 10, 2022).
(Continued)

*Primary Examiner* — Kristal Feggins
(74) *Attorney, Agent, or Firm* — Kenealy Vaidya LLP

(57) ABSTRACT

A printing cassette is attachable to a printer body including a cassette accommodating portion provided with a first engaging portion and a second engaging portion. The printing cassette includes a power transmission mechanism including an input rotational part and an output rotational part, and a guide case accommodating the power transmission mechanism therein. The guide case has a guide portion configured to guide a printing tape, a first side surface and a second side surface interposing the power transmission mechanism therebetween, a first engagement surface engageable with the first engaging portion, and a second engagement surface engageable with the second engaging portion. A first imaginary straight line is defined in the printing cassette, the first imaginary straight line passing through the first engagement surface and the second engagement surface and being interposed between a rotation axis of the input rotational part and a rotation axis of the output rotational part.

27 Claims, 13 Drawing Sheets

(56) References Cited

U.S. PATENT DOCUMENTS

| | | | | |
|---|---|---|---|---|
| 2010/0119280 | A1 | 5/2010 | Vandermeulen | |
| 2010/0166475 | A1 | 7/2010 | Yamaguchi et al. | |
| 2010/0166477 | A1 | 7/2010 | Yamaguchi et al. | |
| 2010/0166478 | A1 | 7/2010 | Yamaguchi et al. | |
| 2010/0166479 | A1 | 7/2010 | Yamaguchi et al. | |
| 2010/0166480 | A1 | 7/2010 | Yamaguchi et al. | |
| 2010/0247205 | A1 | 9/2010 | Yamaguchi et al. | |
| 2010/0247206 | A1 | 9/2010 | Yamaguchi et al. | |
| 2010/0247207 | A1 * | 9/2010 | Sago | B41J 15/044 400/207 |
| 2010/0247208 | A1 | 9/2010 | Yamaguchi et al. | |
| 2010/0247212 | A1 | 9/2010 | Yamaguchi et al. | |
| 2010/0254742 | A1 | 10/2010 | Yamaguchi et al. | |
| 2016/0159123 | A1 | 6/2016 | Sakano | |
| 2016/0176213 | A1 | 6/2016 | Tanaka | |
| 2016/0368294 | A1 | 12/2016 | Sakano et al. | |
| 2017/0190195 | A1 | 7/2017 | Kosuge et al. | |
| 2018/0079239 | A1 | 3/2018 | Sasaki | |
| 2020/0094576 | A1 | 3/2020 | Murayama | |
| 2020/0207107 | A1 | 7/2020 | Ishimoto et al. | |
| 2020/0207131 | A1 | 7/2020 | Ishimoto et al. | |
| 2020/0307292 | A1 | 10/2020 | Kosuge et al. | |
| 2020/0406655 | A1 * | 12/2020 | Iijima | B65H 23/34 |
| 2021/0023862 | A1 | 1/2021 | Sasaki et al. | |
| 2022/0016919 | A1 | 1/2022 | Murayama | |
| 2024/0010014 | A1 | 1/2024 | Ukai et al. | |

FOREIGN PATENT DOCUMENTS

| | | | | |
|---|---|---|---|---|
| CN | 111376620 | A | 7/2020 | |
| JP | 2000-006504 | A | 1/2000 | |
| JP | 2003276290 | A | 9/2003 | |
| JP | 2009178962 | A | 8/2009 | |
| JP | 2010-234772 | A | 10/2010 | |
| JP | 2012061862 | A | 3/2012 | |
| JP | 2012-158175 | A | 8/2012 | |
| JP | 2012-236307 | A | 12/2012 | |
| JP | 2015085605 | * | 5/2015 | B41J 3/4075 |
| JP | 2015-182318 | A | 10/2015 | |
| JP | 2016175221 | A | 10/2016 | |
| JP | 2017226228 | A | 12/2017 | |
| JP | 2020104510 | A | 7/2020 | |
| JP | 2020168731 | A | 10/2020 | |
| WO | 2019189710 | A1 | 10/2019 | |

OTHER PUBLICATIONS

International Preliminary Report on Patentability for PCT/JP2022/011553 (Sep. 12, 2023).

* cited by examiner

PRINTING CASSETTE HAVING STRUCTURE FOR RESTRAINING POWER TRANSMISSION LOSS, AND PRINTING DEVICE USING THE SAME

REFERENCE TO RELATED APPLICATIONS

This is a by-pass continuation application of International Application No. PCT/JP2022/011553 filed Mar. 15, 2022 claiming priority from Japanese Patent Application No. 2021-050350 filed Mar. 24, 2021. The entire contents of the International Application and the priority application are incorporated herein by reference.

BACKGROUND ART

In a printing device configured to perform printing on a printing tape, a cassette accommodating the printing tape is attached to and detached from a printer body for replacement and supply of the printing tape. Such a type of cassette may incorporate therein a structure provided with a power transmission mechanism including an input part configured to receive a driving force from the printer body and an output part configured to output the driving force to the printer body.

DESCRIPTION

According to the cassette provided with the above-described power transmission mechanism, power transmission loss may occur if the engagement of the printer body with the input part and the output part is insufficient.

In view of the foregoing, according to one aspect, it is an object of the present disclosure to provide a printing cassette capable of reducing power transmission loss.

In order to attain the above and other object, according to one aspect, the present disclosure provides a printing cassette attachable to a printer body including a cassette accommodating portion provided with a first engaging portion and a second engaging portion. The printing cassette includes: a power transmission mechanism including an input rotational part and an output rotational part; and a guide case accommodating at least a part of the power transmission mechanism therein.

The guide case has: a guide portion configured to guide a printing tape; a first side surface and a second side surface arranged to interpose the at least a part of the power transmission mechanism therebetween; a first engagement surface engageable with the first engaging portion; and a second engagement surface engageable with the second engaging portion.

The first engagement surface extends from the first side surface and crosses the first side surface. The second engagement surface extends from the second side surface and crosses the second side surface. A first imaginary straight line is defined, the first imaginary straight line passing through the first engagement surface and the second engagement surface and being interposed between a rotation axis of the input rotational part and a rotation axis of the output rotational part.

With such a structure, since the rotation axis of the input rotational part and the rotation axis of the output rotational part are arranged on opposite sides with respect to the first imaginary straight line, a force applied to the guide case from the first engaging portion and the second engaging portion is less likely to be unbalanced to one of the input rotational part and the output rotational part. Accordingly, this structure can restrain failures in engagement between the input rotational part and the printer body and engagement between the output rotational part and the printer body. As a result, transmission loss of the driving force at the power transmission mechanism can be reduced.

According to another aspect, the present disclosure also provides a printing cassette attachable to a printer body including a cassette accommodating portion provided with a first engaging portion and a second engaging portion. The printing cassette includes: a power transmission mechanism including an input rotational part and an output rotational part; and a guide case accommodating at least a part of the power transmission mechanism therein.

The guide case has: a guide portion configured to guide a printing tape; a first side surface and a second side surface arranged to interpose the at least a part of the power transmission mechanism therebetween; a first engagement surface engageable with the first engaging portion; and a second engagement surface engageable with the second engaging portion.

The first engagement surface extends from the first side surface and crosses the first side surface. The second engagement surface extends from the second side surface and crosses the second side surface. A first imaginary straight line is defined, the first imaginary straight line passing through the first engagement surface and the second engagement surface and being overlapped with the power transmission mechanism as viewed in a first direction parallel to a rotation axis of the input rotational part or in a second direction parallel to a rotation axis of the output rotational part.

With this structure, since the power transmission mechanism is positioned to overlap with the first imaginary straight line, a force applied to the guide case from the first engaging portion and the second engaging portion is less likely to be unbalanced to one of the input rotational part and the output rotational part. Hence, failures in engagement between the input rotational part and the printer body and engagement between the output rotational part and the printer body can be restrained from occurring. As a result, transmission loss of the driving force at the power transmission mechanism can be reduced.

According to still another aspect, the present disclosure also provides a printing device including: a printer body including a cassette accommodating portion provided with a first engaging portion and a second engaging portion; and either one of the printing cassettes according to the above-described aspects.

With these structures, defect of engagement between the input rotational part and the printer body and engagement between the output rotational part and the printer body can be restrained. As a result, transmission loss of the driving force at the power transmission mechanism can be reduced.

1. FIRST EMBODIMENT

1-1. Structure

Figure 1A:
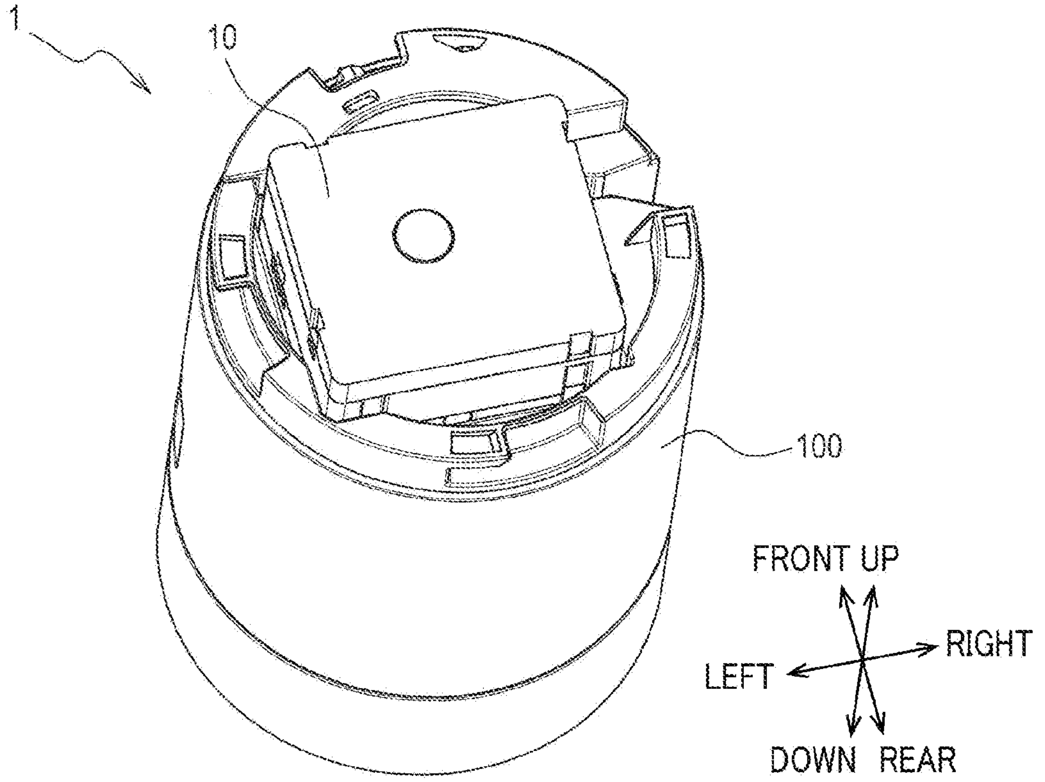
FIG. 1A is a schematic perspective view of a printing device according to one embodiment.

A printing device 1 illustrated in FIG. 1A includes a printing cassette 10 and a printer body 100. The printing device 1 is configured to perform printing on a printing tape 11A.

In the present embodiment, an axial direction of an output gear 21 will be referred to as an up-down direction, a direction perpendicular to the up-down direction and coincident with a conveying direction of the printing tape 11A at a discharge opening 33C will be referred to as a left-right direction, and a direction perpendicular to both of the up-down direction and the left-right direction will be referred to as a front-rear direction.

<Printer Body>

Figure 1B:
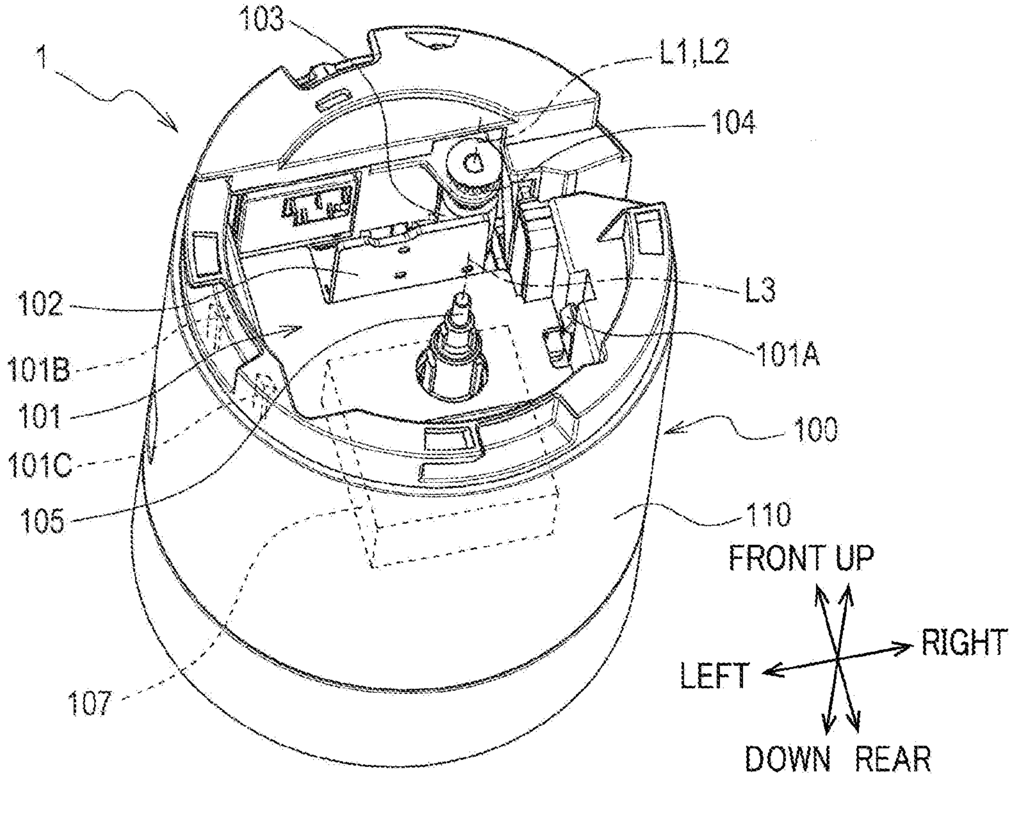
FIG. 1B is a schematic perspective view of a printer body of the printing device of FIG. 1A.

As illustrated in FIG. 1B, the printer body 100 includes a cassette accommodating portion 101, a printing head 102, a platen roller 103, a platen gear 104, a drive shaft 105, a drive source 107, and a housing 110.

(Cassette Accommodating Portion)

The cassette accommodating portion 101 is a recessed portion to which the printing cassette 10 is attachable. The cassette accommodating portion 101 has a function to fix the printing cassette 10 in position. The cassette accommodating portion 101 is provided in the housing 110.

The cassette accommodating portion 101 includes a first engaging portion 101A, a second engaging portion 101B, and a third engaging portion 101C. The first engaging portion 101A, the second engaging portion 101B, and the third engaging portion 101C are configured to be engaged with a case 35 of the printing cassette 10 inserted in the cassette accommodating portion 101.

The first engaging portion 101A, the second engaging portion 101B, and the third engaging portion 101C are respectively hooks extending in the up-down direction inside the cassette accommodating portion 101 and engageable with the case 35 from the above.

(Printing Head)

The printing head 102 is positioned inside the cassette accommodating portion 101. The printing head 102 includes a plurality of heat generating elements whose heat generation is configured to be controlled independently of each other.

(Platen Roller)

The platen roller 103 is positioned, inside the cassette accommodating portion 101, adjacent to the printing head 102 so as to face the printing head 102. The platen roller 103 is pivotally movable toward and away from the printing head 102. The platen roller 103 has a rotation axis L1 that is parallel to the up-down direction.

(Platen Gear)

The platen gear 104 is connected to the platen roller 103. In the present embodiment, the platen gear 104 has a rotation axis L2 that is coincident with the rotation axis L1 of the platen roller 103. The platen gear 104 is pivotally movable together with the platen roller 103.

(Drive Shaft)

The drive shaft 105 is configured to be inserted in a take-up spool 16 and an input gear 22 of the printing cassette 10. The drive shaft 105 is configured to input a driving force into the printing cassette 10 to rotate the take-up spool 16 and the input gear 22.

The drive shaft 105 is positioned inside the cassette accommodating portion 101. The drive shaft 105 has a rotation axis L3 that is parallel to the up-down direction. The drive shaft 105 is rotatable about its rotation axis L3 by the drive source 107.

(Driving Source)

The drive source 107 is configured to drivingly rotate the drive shaft 105. As the drive source 107, a mechanism combining a motor and a gear is available, for example.

<Printing Cassette>

The printing cassette 10 stores therein the printing tape 11A. The printing cassette 10 is attachable to and detachable from the printer body 100. By replacing the printing cassette 10, replenishment of a printing medium and change of a kind (for example, size, color, and material, etc.) of the printing medium can be performed.

Figure 2B:
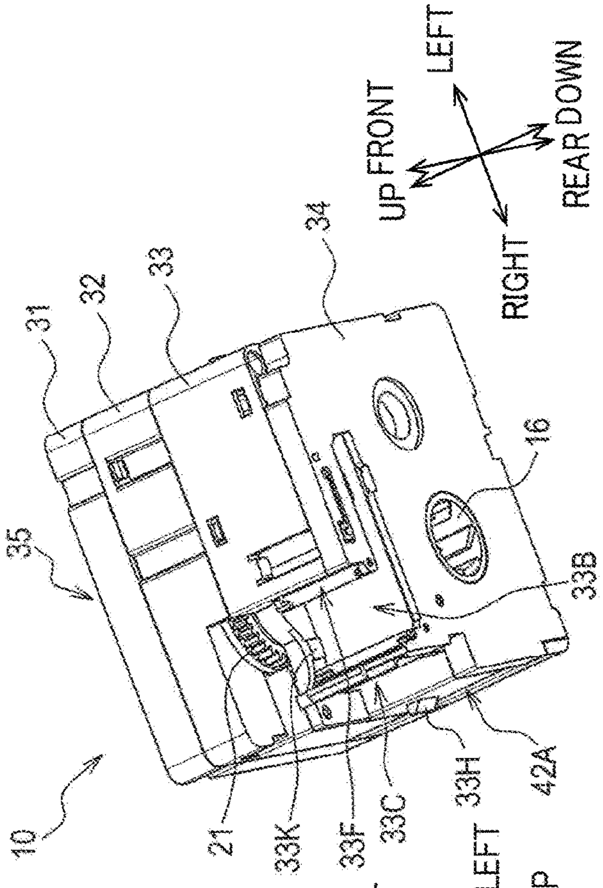
FIG. 2B is another schematic perspective view of the printing cassette in the printing device of FIG. 1A.
Figure 2A:
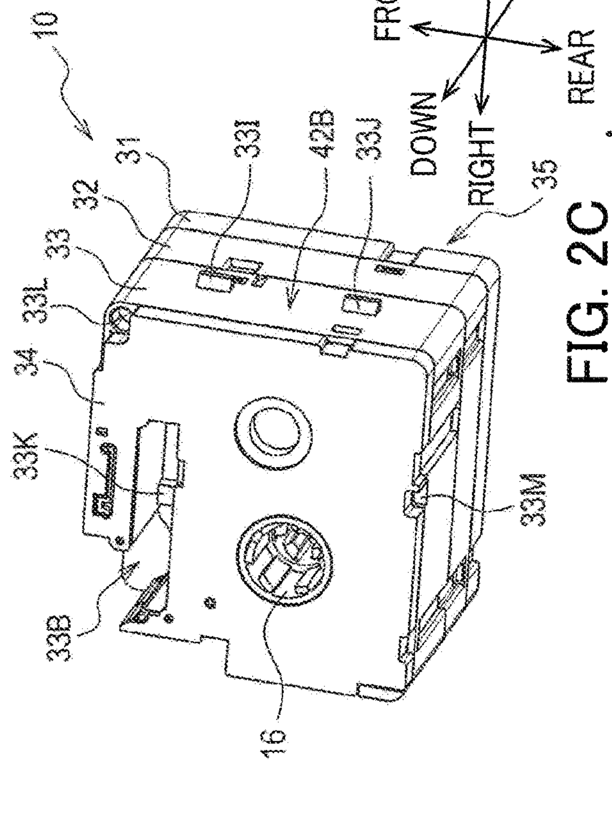
FIG. 2A is a schematic perspective view of a printing cassette in the printing device of FIG. 1A.
Figure 2C:
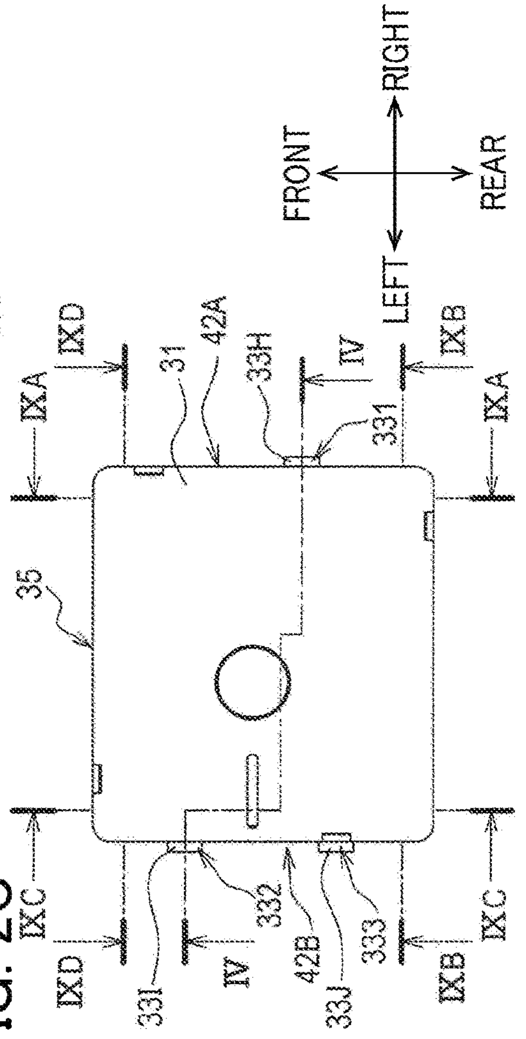
FIG. 2C is a schematic plan view of the printing cassette of FIG. 2A.

As illustrated in FIGS. 2A, 2B and 2C, the printing cassette 10 includes the case 35 that accommodates therein at least a part of the printing tape 11A and at least a part of an ink ribbon 14A (as an example of an auxiliary tape).

An outer shape of the printing cassette 10 (that is, the outer shape of the case 35) is a rectangular parallelepiped shape having sides parallel to the up-down direction, another sides parallel to the front-rear direction, and still another sides parallel to the left-right direction. The case 35 can be inserted downward into the cassette accommodating portion 101.

Figure 3:
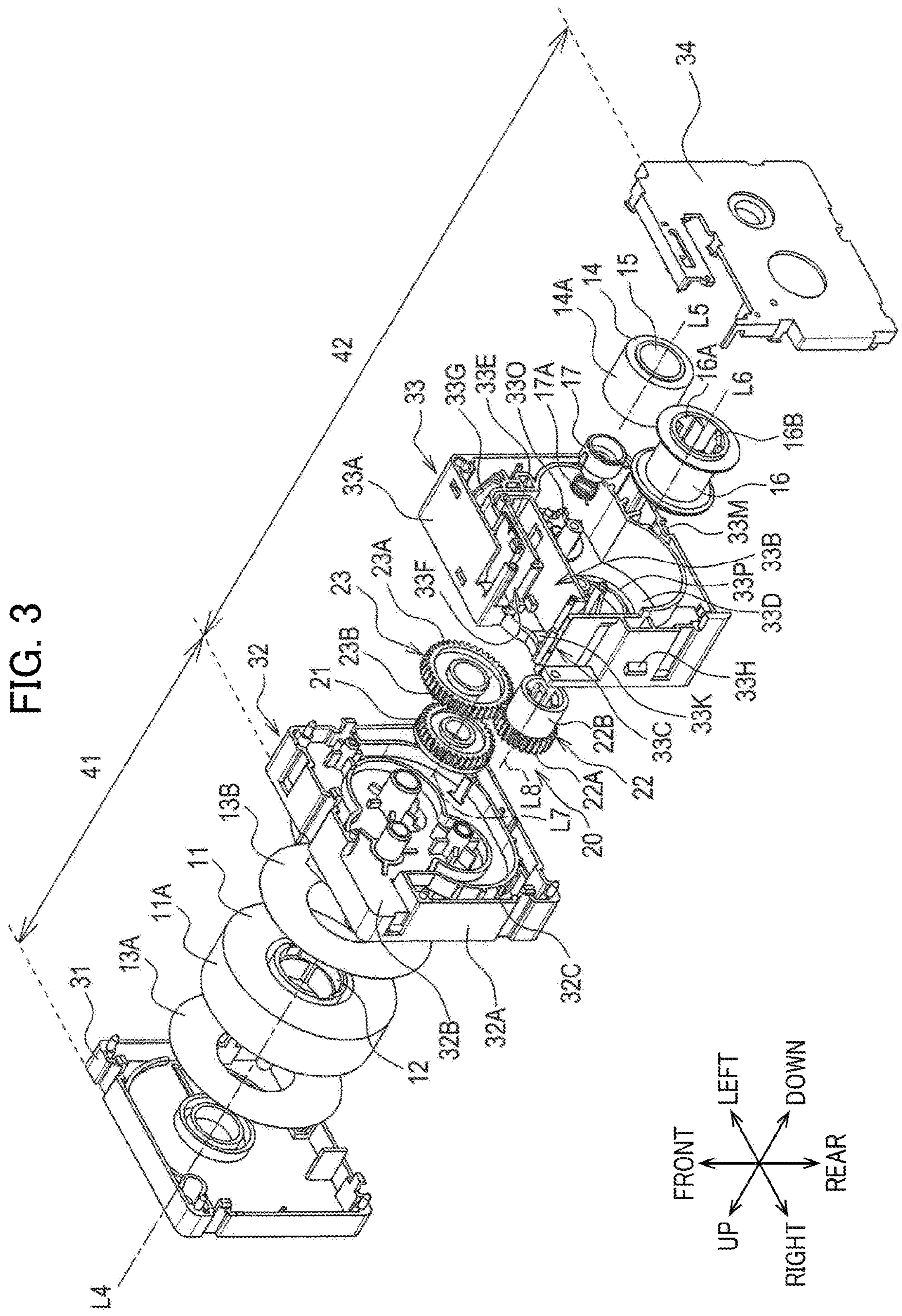
FIG. 3 is an exploded perspective view of the printing cassette of FIG. 2A.

As illustrated in FIG. 3, the printing cassette 10 includes a printing tape roll 11, a first supply spool 12, spacer films 13A, 13B, an auxiliary tape roll 14, a second supply spool 15, the take-up spool 16, a clutch spring holder 17, and a power transmission mechanism 20.

(Printing Tape Roll)

The printing tape roll 11 is configured by winding the printing tape 11A over the first supply spool 12. On a surface of the printing tape 11A, printing is performed by the printing head 102 of the printer body 100 and the ink ribbon 14A.

The two spacer films 13A and 13B are positioned on both outer sides in the up-down direction of the printing tape roll 11 such that the spacer films 13A and 13B nip the printing tape roll 11 therebetween. The spacer film 13A is positioned between the printing tape roll 11 and a first cover part 31, and the spacer film 13B is positioned between the printing tape roll 11 and a first frame part 32.

(First Supply Spool)

The first supply spool 12 is rotatable about its rotation axis L4 parallel to the up-down direction. The first supply spool 12 is configured to rotate in accordance with conveyance of the printing tape 11 by the platen roller 103 of the printer body 100, thereby supplying the printing tape 11A to the printing head 102. The rotation axis L4 of the first supply spool 12 is coincident with an axis of winding of the printing tape roll 11.

(Auxiliary Tape Roll)

The auxiliary tape roll 14 is configured by winding the ink ribbon 14A to be used for printing over the second supply spool 15.

The ink ribbon 14A is superposed with the printing tape 11A at a head opening 33B, and is then to be used for printing by the printing head 102. The ink ribbon 14A used for printing is then configured to be taken-up by the take-up spool 16.

To the auxiliary tape roll 14, a rotational resistance is imparted by a clutch spring 17A held by the clutch spring holder 17. At least a part of the auxiliary tape roll 14 is positioned to overlap with the printing tape roll 11 in the up-down direction.

(Second Supply Spool)

The second supply spool 15 is rotatable about its rotation axis L5. The rotation axis L5 of the second supply spool 15 is parallel to the up-down direction. The second supply spool 15 is configured to rotate in accordance with taking up of the ink ribbon 14A by the take-up spool 16, thereby supplying the ink ribbon 14A to the printing head 102.

(Take-Up Spool)

The take-up spool 16 is rotatable about its rotation axis L6. The rotation axis L6 of the take-up spool 16 is parallel to the rotation axis L5 of the second supply spool 15.

The take-up spool 16 has a hollow cylindrical shape, and has an inner peripheral surface 16A that defines a hollow part. The inner peripheral surface 16A of the take-up spool 16 is formed with spline teeth 16B. To the spline teeth 16B, the drive shaft 105 of the printer body 100 is configured to be connected. The take-up spool 16 is configured to be rotated by the drive shaft 105 to take up the ink ribbon 14A.

(Power Transmission Mechanism)

The power transmission mechanism 20 is configured to transmit the driving force of the drive source 107 from the drive shaft 105 to the platen roller 103 upon attachment of the printing cassette 10 to the printer body 100. The power transmission mechanism 20 includes the output gear 21 (an example of an output rotational part), the input gear 22 (an example of an input rotational part), and an idle gear 23.

Figure 4:
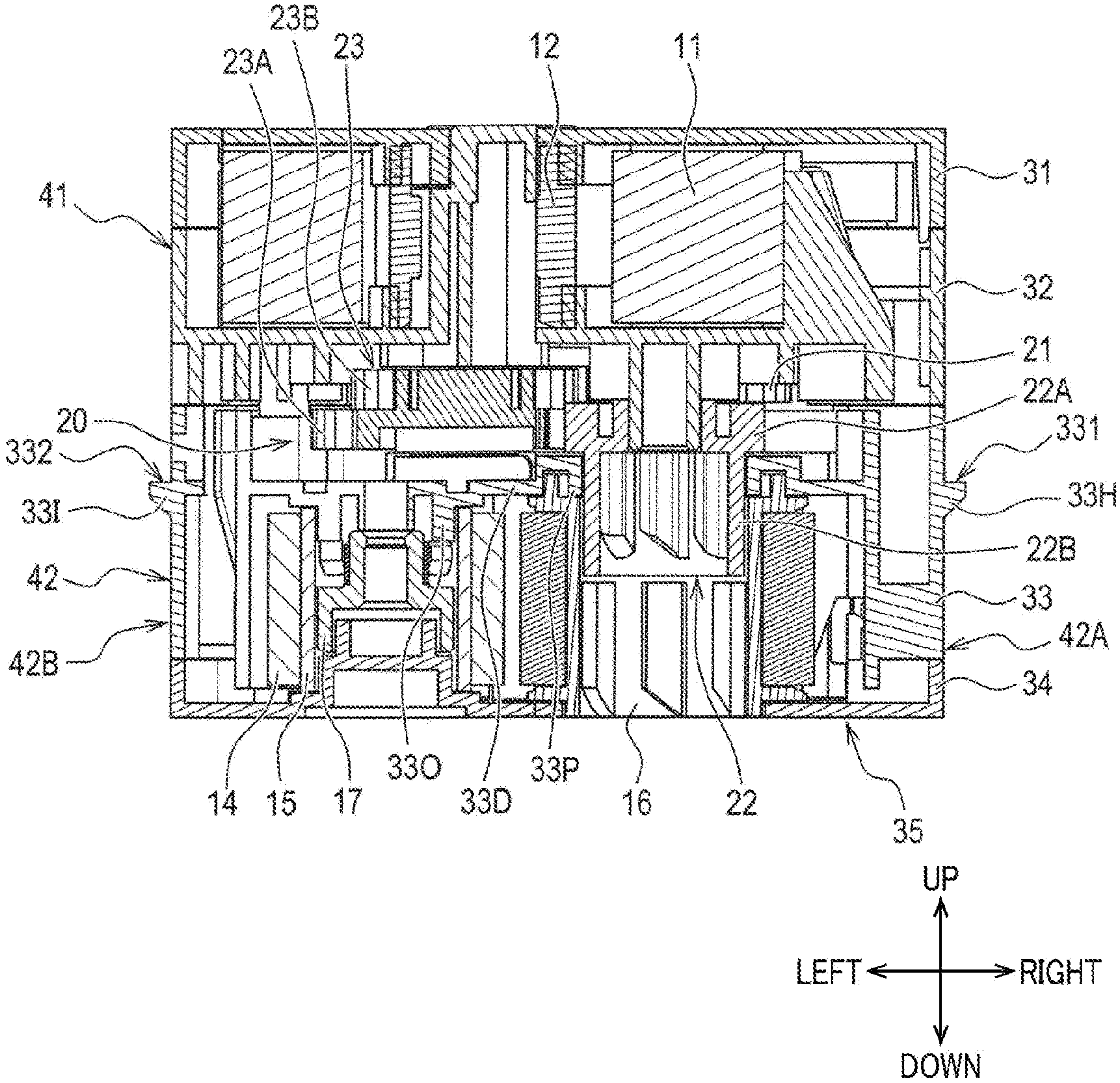
FIG. 4 is a cross-sectional view taken along a line IV-IV in FIG. 2C.

As illustrated in FIG. 4, the printing tape roll 11, the power transmission mechanism 20, and the take-up spool 16 are arranged in the up-down direction in an order of the printing tape roll 11, the power transmission mechanism 20 and the take-up spool 16.

(Output Gear)

The output gear 21 illustrated in FIG. 3 is an externally toothed gear configured to output the driving force to an outside for conveying the printing tape 11A. Specifically, the output gear 21 is configured to transmit the driving force to the platen gear 104 of the printer body 100.

The output gear 21 has a rotation axis L7 that is parallel to the rotation axis L5 of the second supply spool 15 (that is, parallel to the up-down direction). An entirety of the output gear 21 is overlapped with a partition wall 32B of the case 35 in the up-down direction. Further, the output gear 21 has a part that is exposed to a space in communication with the head opening 33B.

The output gear 21 is configured to mesh with the platen gear 106 at the space in communication with the head opening 33B upon attachment of the printing cassette 10 to the printer body 100 (that is, upon accommodation of the case 35 in the cassette accommodating portion 101).

(Input Gear)

The input gear 22 indirectly meshes with the output gear 21 through the idle gear 23 to transmit the driving force to the output gear 21.

The input gear 22 includes an external gear 22A, and a spool 22B which is a hollow cylindrical-shaped internal gear. The spool 22B is fixed to a surface of the external gear 22A and has spline teeth at an inner peripheral surface of the spool 22B. The external gear 22A is rotatable together with the spool 22B by the driving force of the drive source 107 inputted in the spool 22B.

The input gear 22 has a rotation axis L8 (that is, the rotation axes of the external gear 22A and the spool 22B) that is parallel to the up-down direction and that is on the same line as the rotation axis L6 of the take-up spool 16. At least a part of the input gear 22 is positioned to overlap with the printing tape roll 11 in the up-down direction.

The rotation axis L8 of the input gear 22 is overlapped with the hollow part of the take-up spool 16 in the up-down direction. Hence, the drive shaft 105 penetrates through the take-up spool 16 and the input gear 22 at the same time in a state where the printing cassette 10 is attached to the printer body 100. As a result, the input gear 22 is rotatable together with the take-up spool 16 by the drive shaft 105, even though the input gear 22 is not directly connected to the take-up spool 16.

(Idle Gear)

The idle gear 23 is drivingly connected to the input gear 22 and the output gear 21 (that is, the idle gear idle gear 23 is meshingly engaged with the input gear 22 and the output gear 21) to transmit the driving force inputted in the input gear 22 to the output gear 21.

The idle gear 23 is a stepped gear configured of an upstream gear 23A, and a downstream gear 23B coaxially arranged with the upstream gear 23A. The upstream gear 23A is in meshing engagement with the input gear 22. The downstream gear 23B is in meshing engagement with the output gear 21. The downstream gear 23B has a smaller diameter than the upstream gear 23A. Further, the downstream gear 23B is positioned closer to the printing tape roll 11 in the up-down direction (i.e., above) than the upstream gear 23A is to the printing tape roll 11 in the up-down direction.

The idle gear 23 is configured to deceleratingly transmit the driving force inputted in the input gear 22 to the output gear 21. That is, the power transmission mechanism 20 includes a deceleration mechanism providing, as a reduction ratio, a transmission ratio obtained by dividing a rotation speed of the input gear 22 by a rotation speed of the output gear 21.

(Case)

The case 35 includes the first cover part 31, the first frame part 32, a second frame part 33, and a second cover part 34.

The first cover part 31 constitutes an upper end portion of the printing cassette 10. The first frame part 32 is positioned below the first cover part 31, and is connected to the first cover part 31 in the up-down direction. The second frame part 33 is positioned below the first frame part 32, and is connected to the first frame part 32 in the up-down direction. The second cover part 34 constitutes a lower end portion of the printing cassette 10. The second cover part 34 is connected to the second frame part 33 in the up-down direction.

The first cover part 31 and the first frame part 32 constitute in combination a roll case 41 for accommodating the printing tape roll 11 therein. That is, the printing tape roll 11 is positioned in a space defined by the first cover part 31 and the first frame part 32.

The first frame part 32, the second frame part 33 and the second cover part 34 constitute in combination a guide case 42 for accommodating therein a part of the output gear 21, the input gear 22, the idle gear 23, the auxiliary tape roll 14, the second supply spool 15, and the take-up spool 16.

Specifically, the part of the output gear 21, the input gear 22, the idle gear 23 are accommodated in a space defined by the first frame part 32 and the second frame part 33. The auxiliary tape roll 14, the second supply spool 15, and the take-up spool 16 are positioned in a space defined by the second cover part 34 and the second frame part 33.

The guide case 42 is at a position different from the position of the printing tape roll 11 (specifically, below) in the up-down direction.

The first frame part 32 includes a first side wall 32A, the partition wall 32B, and a first guide 32C. The first side wall 32A constitutes an outer side surface of the case 35 that is parallel to the up-down direction. The partition wall 32B has a surface perpendicular to the up-down direction, and extends in the front-rear direction and in the left-right direction. The partition wall 32B is overlapped with the printing tape roll 11 and the power transmission mechanism 20 in the up-down direction.

Figure 5:
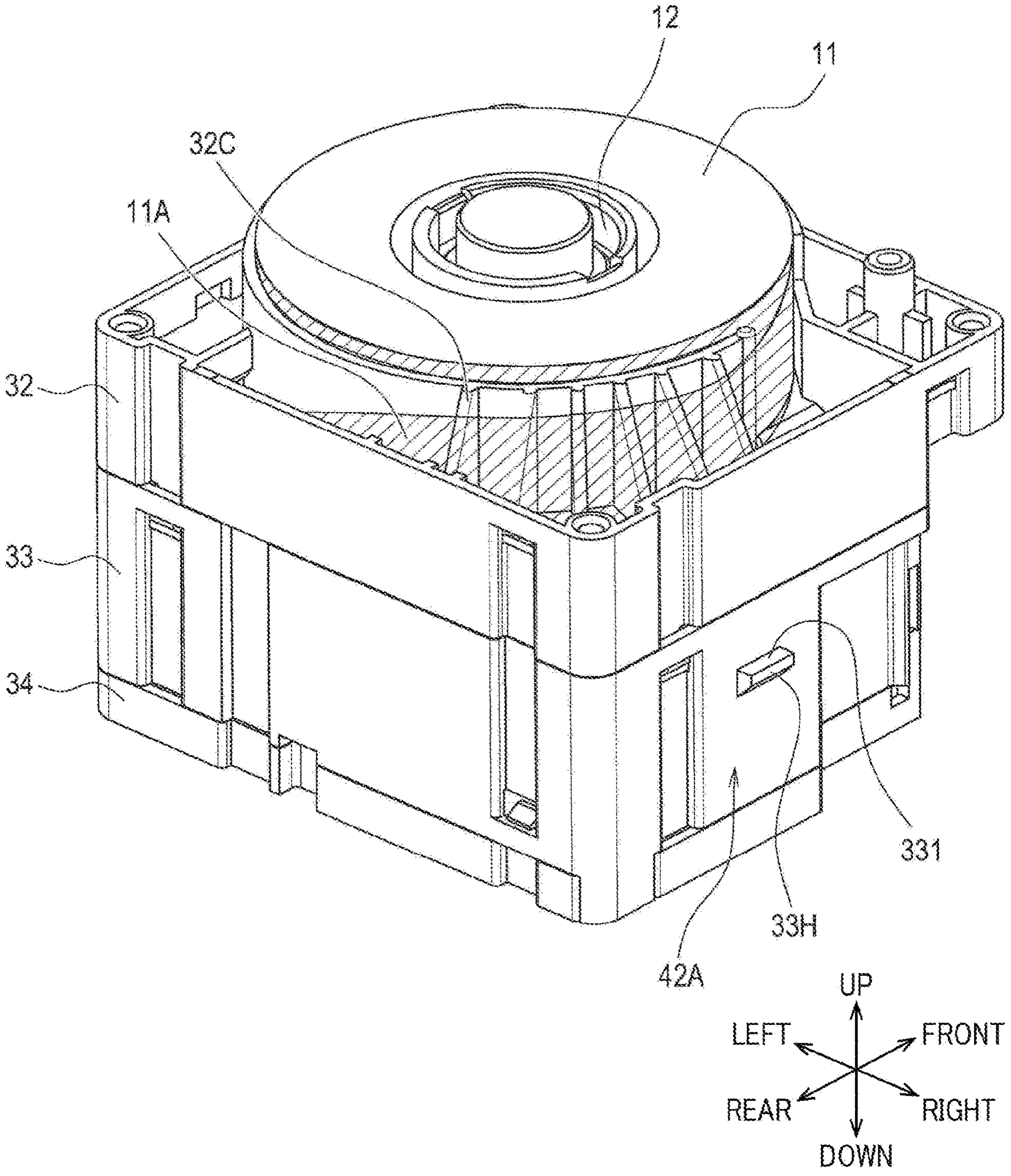
FIG. 5 is a schematic perspective view of the printing cassette of FIG. 2A in a state where a first cover part is removed.

As illustrated in FIG. 5, the first guide 32C is a portion along which the printing tape 11A paid out from the printing tape roll 11 is wound. The first guide 32C includes a plurality of plate-like ribs arranged to be spaced away from one another in a circumferential direction of the printing tape roll 11. The ribs protrude outward in a radial direction of the printing tape roll 11 such that a protruding amount of each rib (that is, a plate width) gradually increases toward the bottom.

The second frame part 33 illustrated in FIG. 3 includes a second side wall 33A, the head opening 33B, the discharge opening 33C, a wall section 33D, an arm portion 33E, a discharge portion 33F, a second guide 33G (an example of a guide portion), first through third pawls 33H, 33I, 33J (see FIGS. 2A and 2B), and first through third abutment portions 33K, 33L, 33M.

In the second frame part 33, at least the head opening 33B, the wall section 33D, the arm portion 33E, the discharge portion 33F, the second guide 33G, the first through third pawls 33H, 33I, 33J, and the first through third abutment portions 33K, 33L, 33M are positioned inside the guide case 42.

The second side wall 33A constitutes an outer side surface of the case 35 extending parallel to the up-down direction. The head opening 33B is a notched part of the second side wall 33A. The head opening 33B is a space in which the printing head 102 is arranged in the state where the printing cassette 10 is attached to the printer body 100.

In the head opening 33B, the printing head 102 performs printing on the printing tape 11A. The head opening 33B is open downward of the printing cassette 10 so that the printing head 102 can be inserted in the head opening 33B from below.

Figure 6:
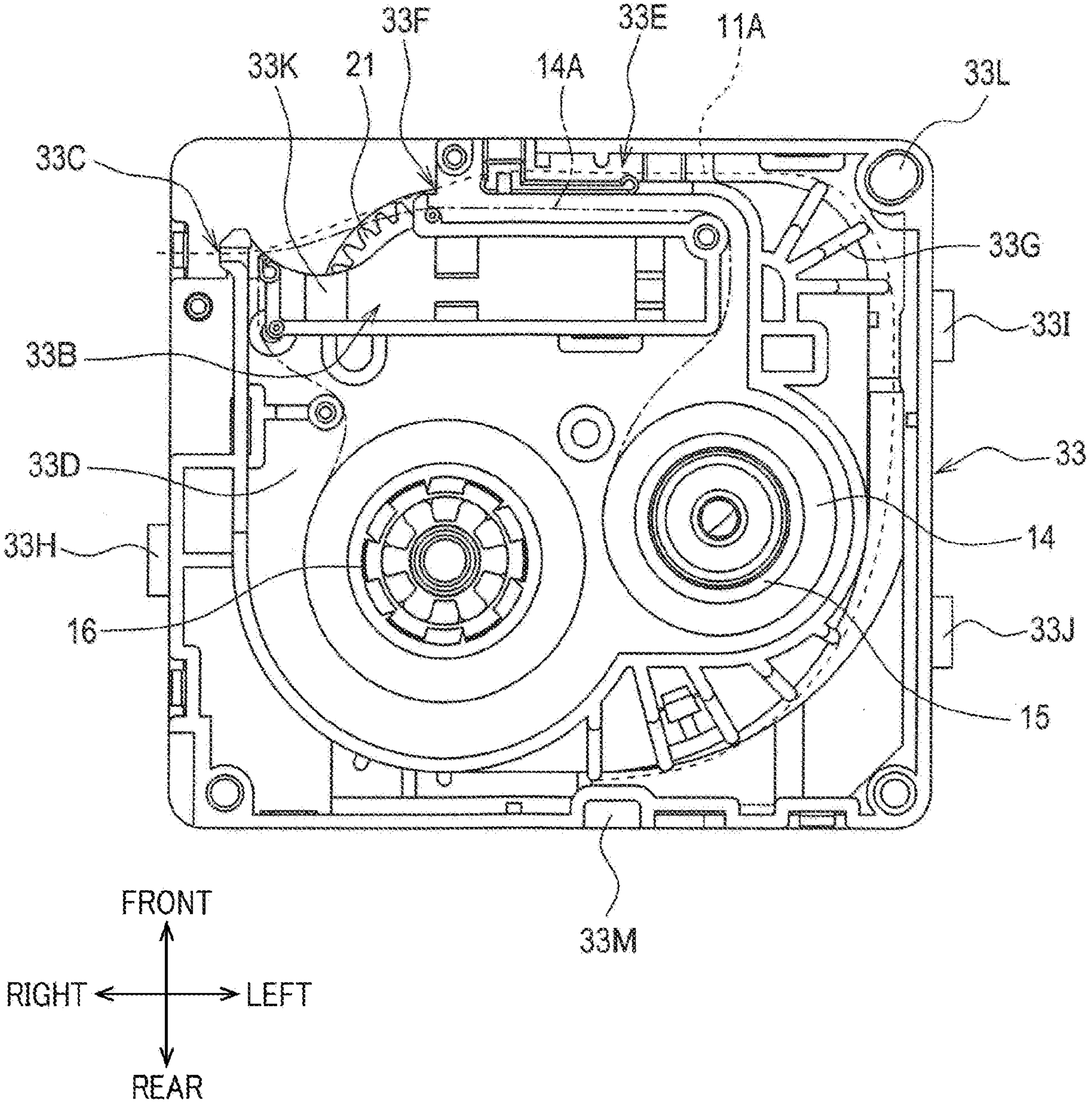
FIG. 6 is a schematic view illustrating travel routes of a printing tape and an ink ribbon in the printing cassette of FIG. 2A.

As illustrated in FIG. 6, the printing tape 11A and the ink ribbon 14A are arranged to extend in the left-right direction at the head opening 33B. The printing tape 11A is exposed to an outside of the case 35 and is superposed with the ink ribbon 14A at the head opening 33B. After being printed, the printed printing tape 11A is discharged to the outside of the printing device 1 through the discharge opening 33C.

The wall section 33D illustrated in FIG. 3 has a surface perpendicular to the up-down direction, and extends in the front-rear direction and the left-right direction. The wall section 33D has a first shaft portion 33O rotatably supporting the second supply spool 15, and a second shaft portion 33P rotatably supporting the take-up spool 16.

The arm portion 33E is configured to convey the printing tape 11A in the left-right direction at a position upstream of the head opening 33B and the discharge opening 33C in a discharging direction of the printing tape 11A. The arm portion 33E constitutes a tunnel surrounding the printing tape 11A in a widthwise direction thereof as well as in a thickness direction of the printing tape 11A.

The discharge portion 33F allows the printing tape 11A, which has moved past the arm portion 33E, to be discharged to the outside (specifically, to the space in communication with the head opening 33B). The discharge portion 33F constitutes an outlet of the arm portion 33E. The printing tape 11A discharged through the discharge portion 33F is then conveyed to the discharge opening 33C through the head opening 33B.

Similar to the first guide 32C, the second guide 33G is a portion along which the printing tape 11A paid out from the printing tape roll 11 is wound. The second guide 33G has a plurality of plate-like ribs arranged to be spaced away from one another in a circumferential direction of the auxiliary tape roll 14. The ribs protrude outward in a radial direction of the auxiliary tape roll 14, and a protruding amount of each rib (i.e., a plate width) gradually decreases toward the bottom.

Each of the first pawl 33H, the second pawl 33I, and the third pawl 33J illustrated in FIGS. 2A, 2B and 2C protrudes outward from the second side wall 33A of the second frame part 33.

The first pawl 33H is positioned at a first side surface 42A of the guide case 42. The first side surface 42A is overlapped with the second guide 33G in a direction perpendicular to the center axis of the printing tape roll 11 (specifically, in the left-right direction). The first side surface 42A is perpendicular to the left-right direction and constitutes a right side surface of the guide case 42.

The first pawl 33H has a first engagement surface 331 engageable with the first engaging portion 101A of the printer body 100. The first engagement surface 331 is constituted by a region of the first pawl 33H that is configured to contact the first engaging portion 101A to restrict upward movement of the guide case 42 (i.e., detachment from the cassette accommodating portion 101).

The first engagement surface 331 extends to protrude outward (that is, rightward) of the guide case 42 from the first side surface 42A. The first engagement surface 331 is a flat plane perpendicular to the up-down direction, and crosses the first side surface 42A.

The second pawl 33I and the third pawl 33J are positioned at a second side surface 42B of the guide case 42. The second side surface 42B is overlapped with the second guide 33G in the direction perpendicular to the center axis of the printing tape roll 11 (specifically, in the left-right direction).

The second side surface 42B is perpendicular to the left-right direction and constitutes a left side surface of the guide case 42. At least a part of the second side surface 42B (in the present embodiment, an entirety of the second side surface 42B) is at the same position as the first side surface 42A in the up-down direction.

The first side surface 42A faces the second side surface 42B in the discharging direction of the printing tape 11A at the discharge portion 33F. Further, the first side surface 42A and the second side surface 42B are positioned to sandwich at least a part of the power transmission mechanism 20 therebetween in the left-right direction.

The second pawl 33I has a second engagement surface 332 engageable with the second engaging portion 101B of the printer body 100. The third pawl 33J has a third engagement surface 333 engageable with the third engaging portion 101C of the printer body 100. The second engagement surface 332 and the third engagement surface 333 are constituted by regions of the second pawl 33I and the third pawl 33J, respectively, the regions being configured to contact the second engaging portion 101B and the third engaging portion 101C, respectively, to restrict upward movement of the guide case 42.

The second engagement surface 332 and the third engagement surface 333 extend respectively to protrude outward (that is, leftward) of the guide case 42 from the second side surface 42B. The second engagement surface 332 and the third engagement surface 333 are flat planes perpendicular to the up-down direction, and respectively cross the second side surface 42B.

The first engagement surface 331, the second engagement surface 332, and the third engagement surface 333 face in a direction (upward) which is opposite to an advancing direction of the guide case 42 (i.e., downward) at the time of insertion of the guide case 42 into the cassette accommodating portion 101.

Figure 7:
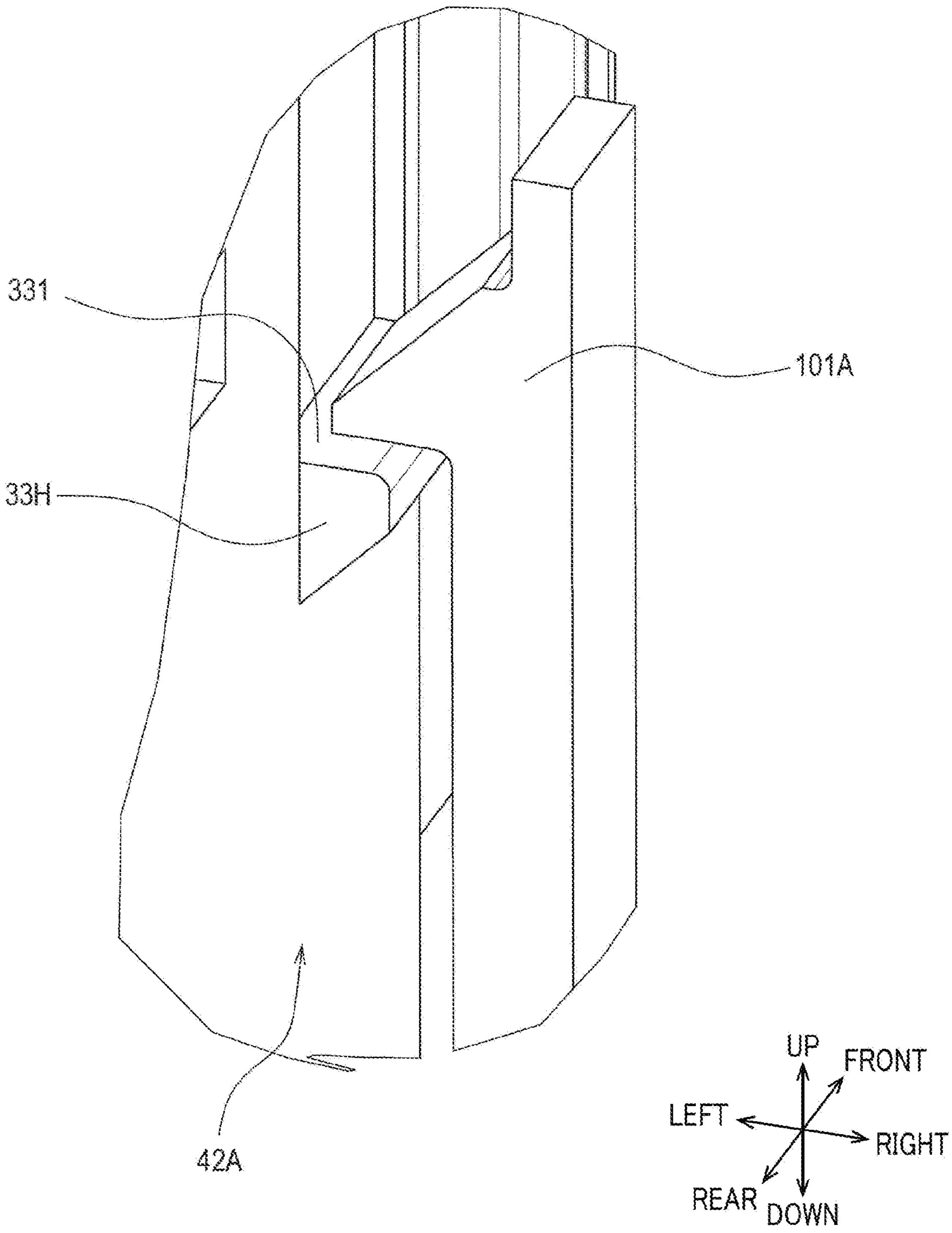
FIG. 7 is a partially-enlarged schematic perspective view illustrating an engagement state of a first engaging portion with a first engagement surface.

That is, as illustrated in FIG. 7, the first engagement surface 331 is configured to be overlapped with a pawl of the first engaging portion 101A from above. Similarly, the second engagement surface 332 and the third engagement surface 333 are configured to be overlapped with pawls of the second engaging portion 101B and the third engaging portion 101C from above. The first engagement surface 331, the second engagement surface 332 and the third engagement surface 333 are respectively perpendicular to the advancing direction of the guide case 42 at the time of insertion of the guide case 42 into the cassette accommodating portion 101.

Incidentally, the first engaging portion 101A, the second engaging portion 101B, and the third engaging portion 101C are respectively movable in the left-right direction. Upon insertion of the case 35 in the cassette accommodating portion 101, a locking state is provided for each engaging portion such that each engaging portion is engaged with each engagement surface. The locking state is released by moving each locking portion in a direction away from the case 35.

As illustrated in FIG. 4, at least a part of the first engagement surface 331 (in the present embodiment, an entirety of the first engagement surface 331) is at the same position as the second engagement surface 332 in the up-down direction. Further, at least a part of the second engagement surface 332 (in the present embodiment, an entirety of the second engagement surface 332) is at the same position as the third engagement surface 333.

The printing tape roll 11, the output gear 21, the first engagement surface 331, and the auxiliary tape roll 14 are arranged in the up-down direction in such an order of the printing tape roll 11, the output gear 21, the first engagement surface 331, and the auxiliary tape roll 14.

That is, the first engagement surface 331, the second engagement surface 332, and the third engagement surface 333 are positioned offset from the output gear 21 on the same side as each other in a direction along the rotation axis L7 of the output gear 21 (specifically, below the output gear 21).

Further, the printing tape roll 11 is positioned opposite the first engagement surface 331, the second engagement surface 332, and the third engagement surface 333 with respect to the output gear 21 in the up-down direction. The auxiliary tape roll 14 is positioned opposite the printing tape roll 11 and the output gear 21 with respect to the first engagement surface 331, the second engagement surface 332, and the third engagement surface 333 in the up-down direction.

Further, at least a part of the first engagement surface 331, at least a part of the second engagement surface 332, and at least a part of the third engagement surface 333 are respectively at the same position as the wall section 33D in the up-down direction. In other words, the first engagement surface 331, the second engagement surface 332, and the third engagement surface 333 are overlapped with the wall section 33D in the left-right direction.

Figure 8:
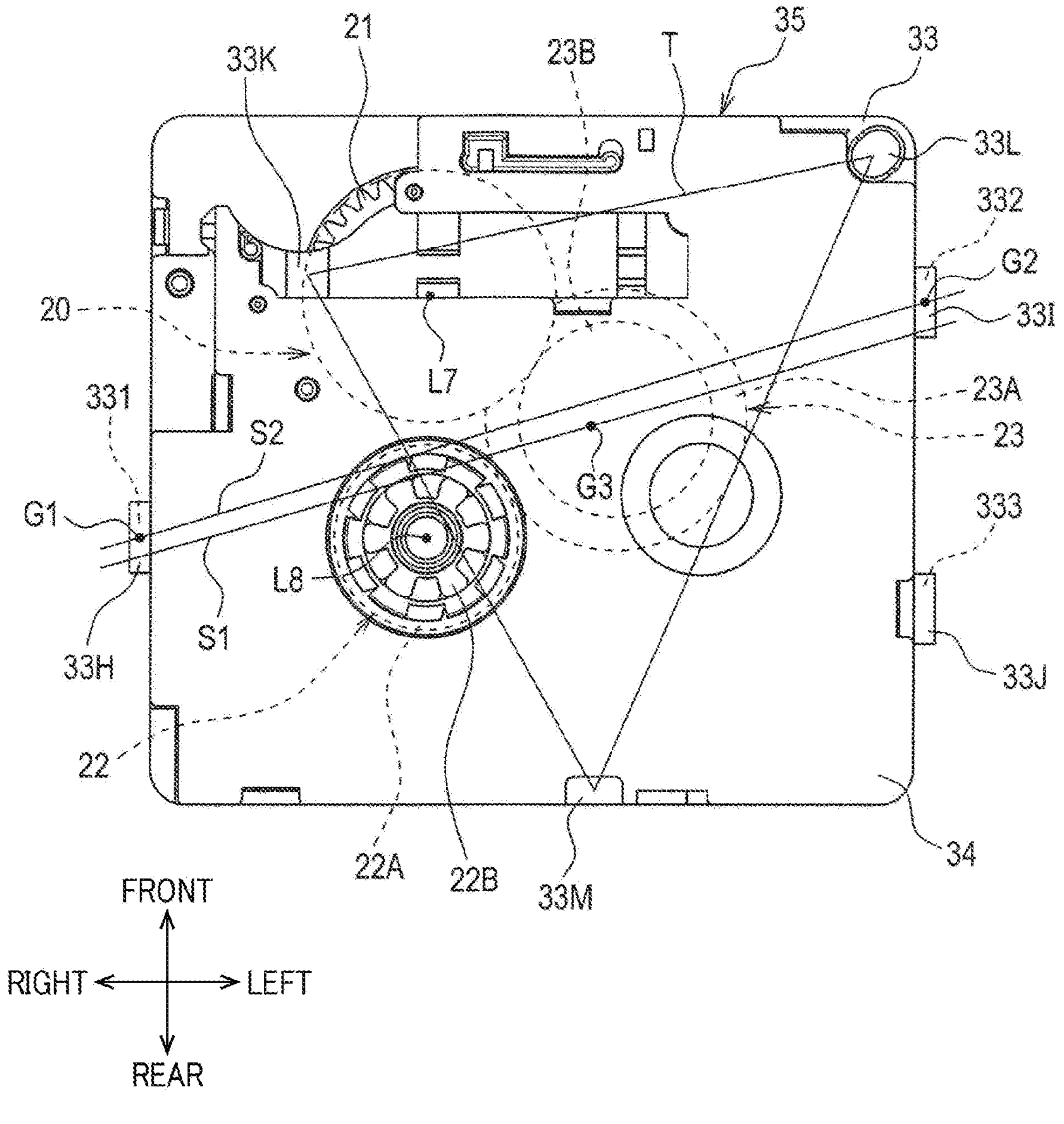
FIG. 8 is a schematic bottom view of the printing cassette of FIG. 2A.

As illustrated in FIG. 8, in the printing cassette 10, a first imaginary straight line S1 is defined, the first imaginary straight line S1 passing through the first engagement surface 331 and the second engagement surface 332 and being interposed between the rotation axis L8 of the input gear 22 and the rotation axis L7 of the output gear 21. Further, the first imaginary straight line S1 is overlapped with the power transmission mechanism 20 (specifically, the input gear 22 and the idle gear 23) as viewed in the up-down direction.

Further, the printing cassette 10 defines a second imaginary straight line S2 passing through a geometric centroid G1 of the first engagement surface 331 and a geometric centroid G2 of the second engagement surface 332 and overlapping with the power transmission mechanism 20 as viewed in the up-down direction.

The first abutment portion 33K, the second abutment portion 33L, and the third abutment portion 33M respectively abut on the printer body 100 in the up-down direction upon insertion of the guide case 42 in the cassette accommodating portion 101.

The first abutment portion 33K, the second abutment portion 33L, and the third abutment portion 33M are configured to make contact with corresponding portions of the printer body 100 from above, thereby providing positioning of the case 35 in the up-down direction relative to the cassette accommodating portion 101.

The first abutment portion 33K, the second abutment portion 33L, and the third abutment portion 33M are positioned to be spaced apart from one another. Further, when viewed in the up-down direction, a direction in which the first abutment portion 33K and the second abutment portion 33L are spaced apart from each other is different from a direction in which the second abutment portion 33L and the third abutment portion 33M are spaced apart from each other.

That is, as viewed in the up-down direction, the first abutment portion 33K, the second abutment portion 33L, and the third abutment portion 33M are not arranged linearly. In other words, there is no imaginary straight line that can pass simultaneously through the first abutment portion 33K, the second abutment portion 33L, and the third abutment portion 33M.

The first abutment portion 33K is positioned to overlap with the head opening 33B in the up-down direction. Specifically, the first abutment portion 33K is positioned above the head opening 33B. The first abutment portion 33K is exposed toward the bottom of the printing cassette 10 through the head opening 33B. The first abutment portion 33K is configured to abut on the printing head 102 that is inserted in the head opening 33B.

The second abutment portion 33L is positioned at a corner portion of the second frame part 33 as viewed in the up-down direction. Specifically, the second abutment portion 33L is constituted by a bottom surface of a hollow cylindrical body positioned at a left-front corner portion of the second frame part 33, the hollow cylindrical body having a center axis parallel to the up-down direction.

The second abutment portion 33L is a bottom surface of a recessed portion which is a part of the second frame part 33 and which is recessed upward. Into the hollow cylindrical body constituting the second abutment portion 33L, a part extending in the up-down direction inside the cassette accommodating portion 101 (for example a pin) is configured to be inserted.

When viewed in the up-down direction, the bottom surface of the recessed portion constituting the second abutment portion 33L extends in a direction perpendicular to the up-down direction. Specifically, the extending direction of the bottom surface of the recessed portion crosses both of the discharging direction of the printing tape 11A at the discharge opening 33C (that is, the left-right direction) and the front-rear direction. More specifically, the bottom surface of the recessed portion extends toward the rotation axis L8 of the input gear 22, and the extending direction of the bottom surface of the recessed portion is perpendicular to a circumferential direction of a circle centered on the rotation axis L8 of the input gear 22.

An inner peripheral surface of the hollow cylindrical body (that is, an inner side surface of the recessed portion) constituting the second abutment portion 33L allows the pin inserted in the hollow cylindrical body to move in a direction crossing the left-right direction and the front-rear direction, but restricts the pin from pivotally moving about the rotation axis L8 of the input gear 22. That is, the inner side surface of the recessed portion restricts the case 35 from rotating about the rotation axis L3 of the drive shaft 105.

The third abutment portion 33M is arranged to be connected to an outer side surface of the second frame part 33 which is parallel to the up-down direction (specifically, a part of a rear side surface of the case 35). The third abutment portion 33M is constituted by a recessed portion formed in the rear side surface of the case 35.

Further, the third abutment portion 33M is at a position different from the position of the bottom surface of the case 35 in the up-down direction (i.e., above the bottom surface). The third abutment portion 33M is configured to abut on an upper end of a part protruding in the up-down direction (for example, a rib) inside the cassette accommodating portion 101.

In the printing cassette 10, an imaginary triangle T is defined as viewed in the up-down direction. The imaginary triangle T is defined by three vertexes positioned within the first abutment portion 33K, the second abutment portion 33L, and the third abutment portion 33M, respectively. The imaginary triangle T is overlapped with the first imaginary straight line S1. Further, the imaginary triangle T defines a center of gravity G3 that is positioned on the first imaginary straight line S1 as viewed in the up-down direction.

As illustrated in FIGS. 9A, 9B, 9C and 9D, the first guide 32C and the second guide 33G define a pathway for conveying the printing tape 11A constituting the printing tape roll 11 from the roll case 41 to the guide case 42.

Figure 9B:
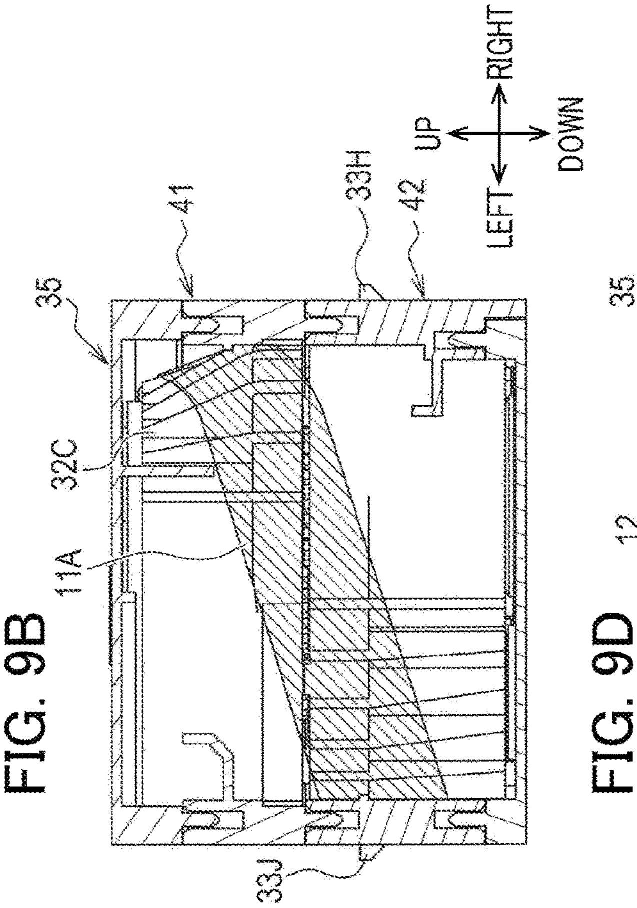
FIG. 9B is a cross-sectional view taken along a line IXB-IXB in FIG. 2C.
Figure 9D:
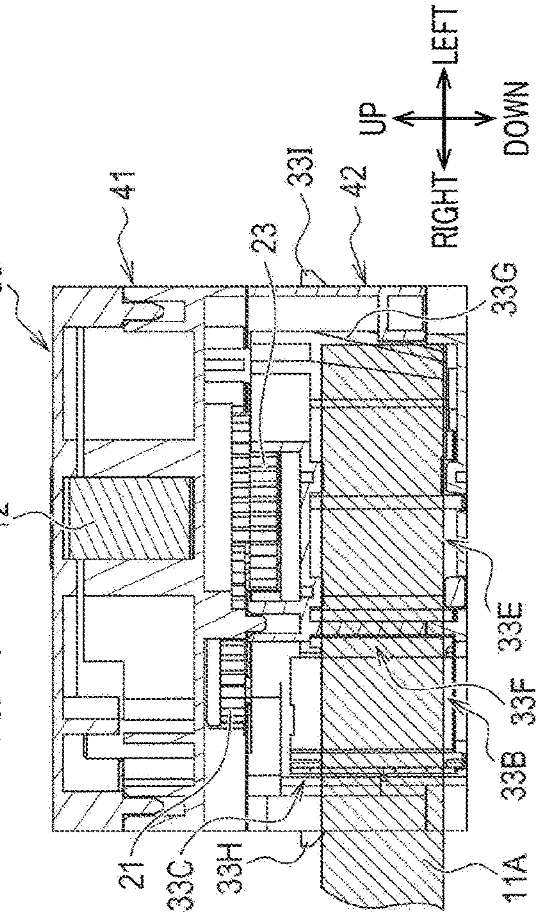
FIG. 9D is a cross-sectional view taken along a line IXD-IXD in FIG. 2C.
Figure 9A:
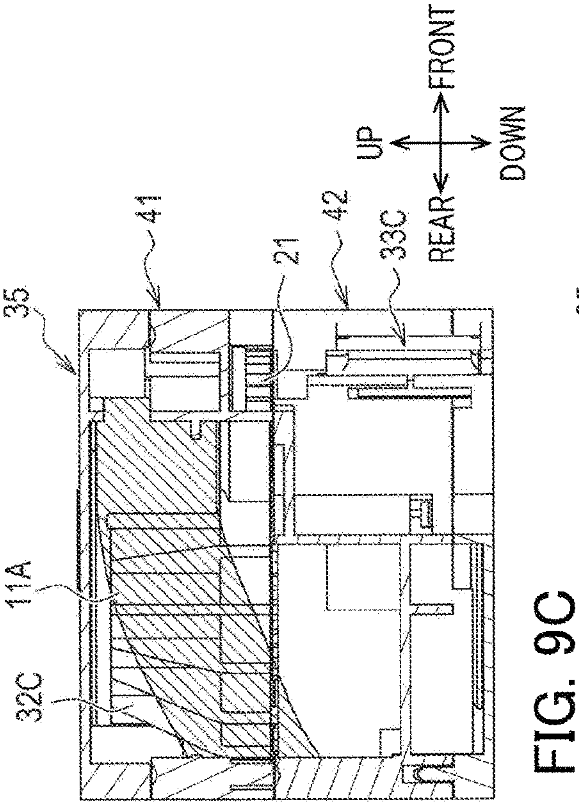
FIG. 9A is a cross-sectional view taken along a line IXA-IXA in FIG. 2C.

Specifically, as illustrated in FIG. 9A, the printing tape 11A paid out from the printing tape roll 11 is helically brought into contact with the first guide 32C from a radially outer side of the printing tape roll 11, so that the printing tape 11A is conveyed diagonally downward and rearward inside the roll case 41. The printing tape 11A is further conveyed diagonally downward and leftward inside the guide case 42, as illustrated in FIG. 9B.

Figure 9C:
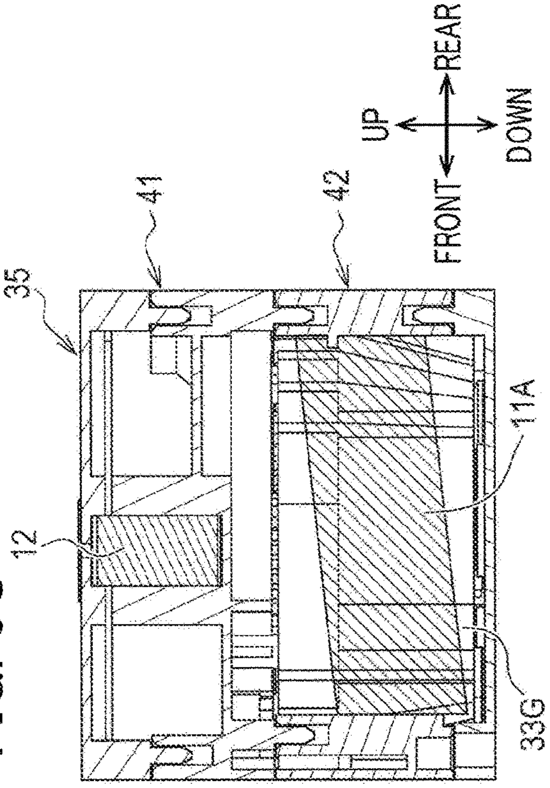
FIG. 9C is a cross-sectional view taken along a line IXC-IXC in FIG. 2C.

The printing tape 11A reaching the guide case 42 is brought into contact with the second guide 33G from a radially outer side thereof, so that the printing tape 11A is conveyed diagonally downward and frontward, as illustrated in FIG. 9C. The printing tape 11A reaching a lower end portion of the printing cassette 10 passes through the head opening 33B and is discharged rightward through the discharge opening 33C, as illustrated in FIG. 9D.

<Conveying Printing Tape and Printing on Printing Tape by Printer Body>

In the state where the printing cassette 10 is attached to the printer body 100, the printing head 102 is positioned, at the head opening 33B, to superpose with the printing tape 11A and the ink ribbon 14A in the front-rear direction.

The printing tape 11A is conveyed to the head opening 33B by the platen roller 103, and is pressed by the platen roller 103 through the ink ribbon 14A against the printing head 102 whose heat generating elements are heated. In this way, a part of ink on a surface of the ink ribbon 14A is transferred to the printing tape 11A, thereby printing letters and marks on the printing tape 11A.

Figure 10:
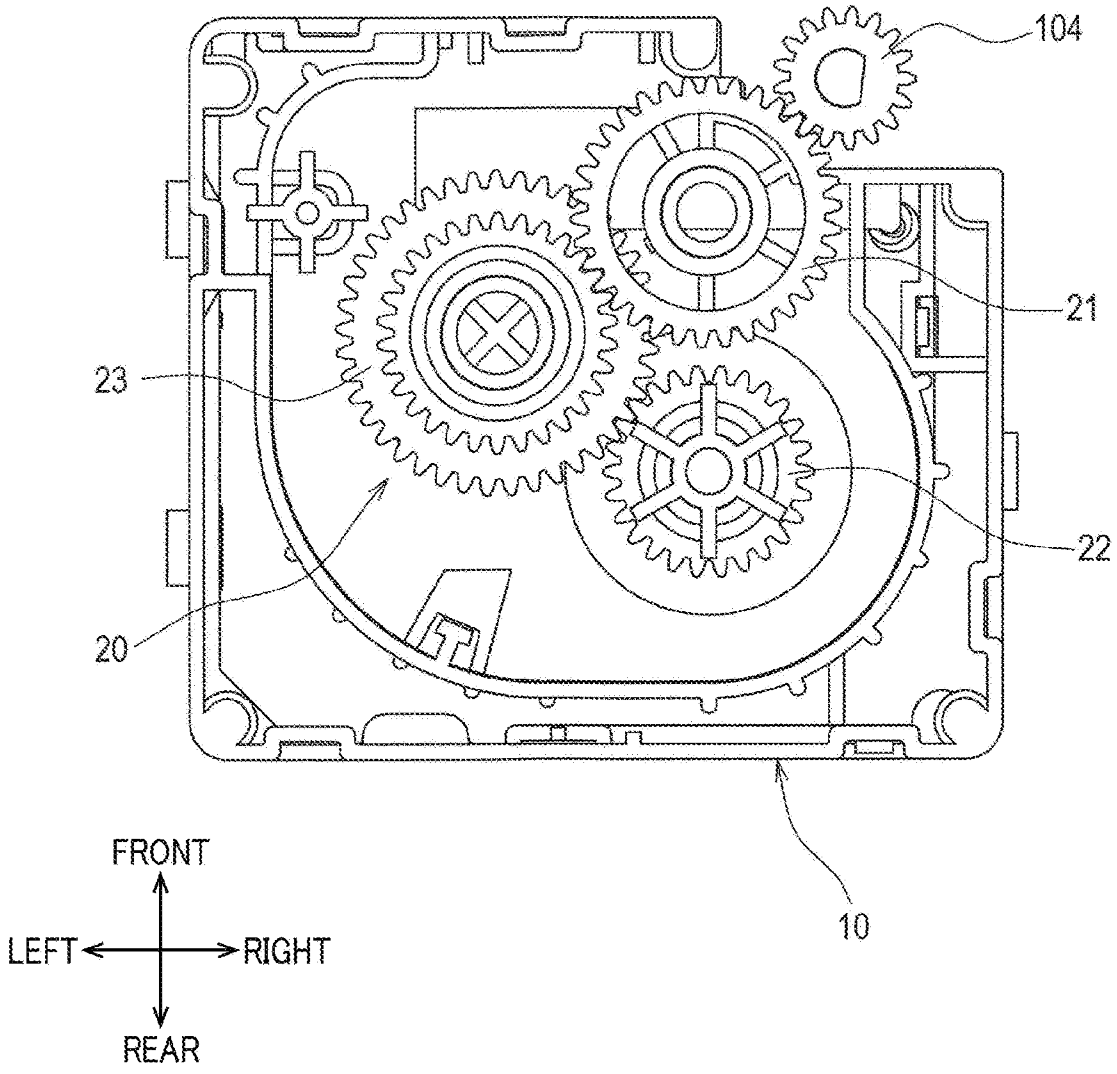
FIG. 10 is a schematic view illustrating an engaging state between an output gear and a platen gear in the printing device of FIG. 1A.

The platen roller 103 conveys the printed printing tape 11A toward the outside of the printing cassette 10. The platen roller 103 is rotated by the platen gear 104 engaged with the output gear 21. The platen roller 103 and the platen gear 104 are pivotally movable between a position away from the printing cassette 10 and a position illustrated in FIG. 10 where the platen gear 104 is engaged with the output gear 21.

In a state where the case 35 of the printing cassette 10 is accommodated in the cassette accommodating portion 101, the drive shaft 105 is engaged with the input gear 22, and the platen gear 104 is engaged with the output gear 21.

Specifically, in a state where the drive shaft 105 is inserted in the take-up spool 16 and the input gear 22, the platen roller 103 and the platen gear 104 pivotally move toward the head opening 33B of the printing cassette 10 to bring the platen gear 104 into engagement with the output gear 21.

In the state where the printing cassette 10 is attached, the drive shaft 105 rotates the input gear 22 which in turn rotates the output gear 21. Further, the rotation of the output gear 21 rotates the platen gear 104, thereby rotating the platen roller 103.

[1-2. Technical Advantages]

The following technical advantages can be obtained according to the above-described embodiment.

(1a) Since the rotation axis L8 of the input gear 22 and the rotation axis L7 of the output gear 21 are on opposite sides with respect to the first imaginary straight line S1, the force applied to the guide case 42 from the first engaging portion 101A and the second engaging portion 101B is less likely to be unbalanced to one of the input gear 22 and the output gear 21.

This structure can suppress failures in engagement between the input gear 22 and the printer body 100 and engagement between the output gear 21 and the printer body 100. As a result, transmission loss of the driving force at the power transmission mechanism 20 can be reduced.

(1b) Since the power transmission mechanism 20 is positioned to overlap with the first imaginary straight line S1, the force applied to the guide case 42 from the first engaging portion 101A and the second engaging portion 101B is less likely to be unbalanced to one of the input gear 22 and the output gear 21.

(1c) Due to the existence of the second imaginary straight line S2 passing through the geometric centroid G1 of the first engagement surface 331 and the geometric centroid G2 of the second engagement surface 332 and overlapped with the power transmission mechanism 20 as viewed in the up-down direction, reduction in power transmission loss at the power transmission mechanism 20 can further be promoted.

(1d) Since the first engagement surface 331 and the second engagement surface 332 are both positioned below the output gear 21, the rotation axis L7 of the output gear 21 is hard to become inclined.

(1e) Since the printing tape roll 11 is positioned opposite the first engagement surface 331 and the second engagement surface 332 with respect to the output gear 21 in the up-down direction, a decline in degree of freedom in designing a size of the case 35 can be suppressed. As a result, an increase in size of the printing cassette 10 can be restrained.

(1f) Enhanced accuracy in positioning of the printing tape roll 11 and the auxiliary tape roll 14 can be obtained, since the auxiliary tape roll 14 is positioned opposite the printing tape roll 11 and the output gear 21 with respect to the first engagement surface 331 and the second engagement surface 332 in the up-down direction.

(1g) Enhanced accuracy in positioning of the printing cassette 10 can be obtained, since the first side surface 42A having the first engagement surface 331 faces the second side surface 42B having the second engagement surface 332 in the discharging direction of the printing tape 11A at the discharge portion 33F.

(1h) Since at least a part of the first engagement surface 331 is at the same position as the second engagement surface 332 in the up-down direction, tilting of the printing cassette 10 can be restrained.

(1i) Enhanced accuracy in positioning of the printing cassette 10 can be achieved, since the third engagement surface 333 is provided at the second side surface 42B.

(1j) The first engaging portion 101A and the second engaging portion 101B can have a simple configuration, since the first engagement surface 331 and the second engagement surface 332 respectively protrude outward of the guide case 42 from the first side surface 42A or from the second side surface 42B.

(1k) Since the first engagement surface 331 and the second engagement surface 332 respectively face upward, the structure for engagement of the guide case 42 with the first engaging portion 101A and the second engaging portion 101B can be simplified.

(1l) Since the first engagement surface 331 and the second engagement surface 332 are respectively flat planes extending perpendicular to the up-down direction, the structure for engagement of the guide case 42 with the first engaging portion 101A and the second engaging portion 101B can be simplified.

(1m) Since at least a part of the first engagement surface 331 and at least a part of the second engagement surface 332 are respectively at the same position as the wall section 33D in the up-down direction, the respective center axes of the auxiliary tape roll 14 and the take-up spool 16 are restrained from getting inclined.

2. SECOND EMBODIMENT

2-1. Structure

Figure 11:
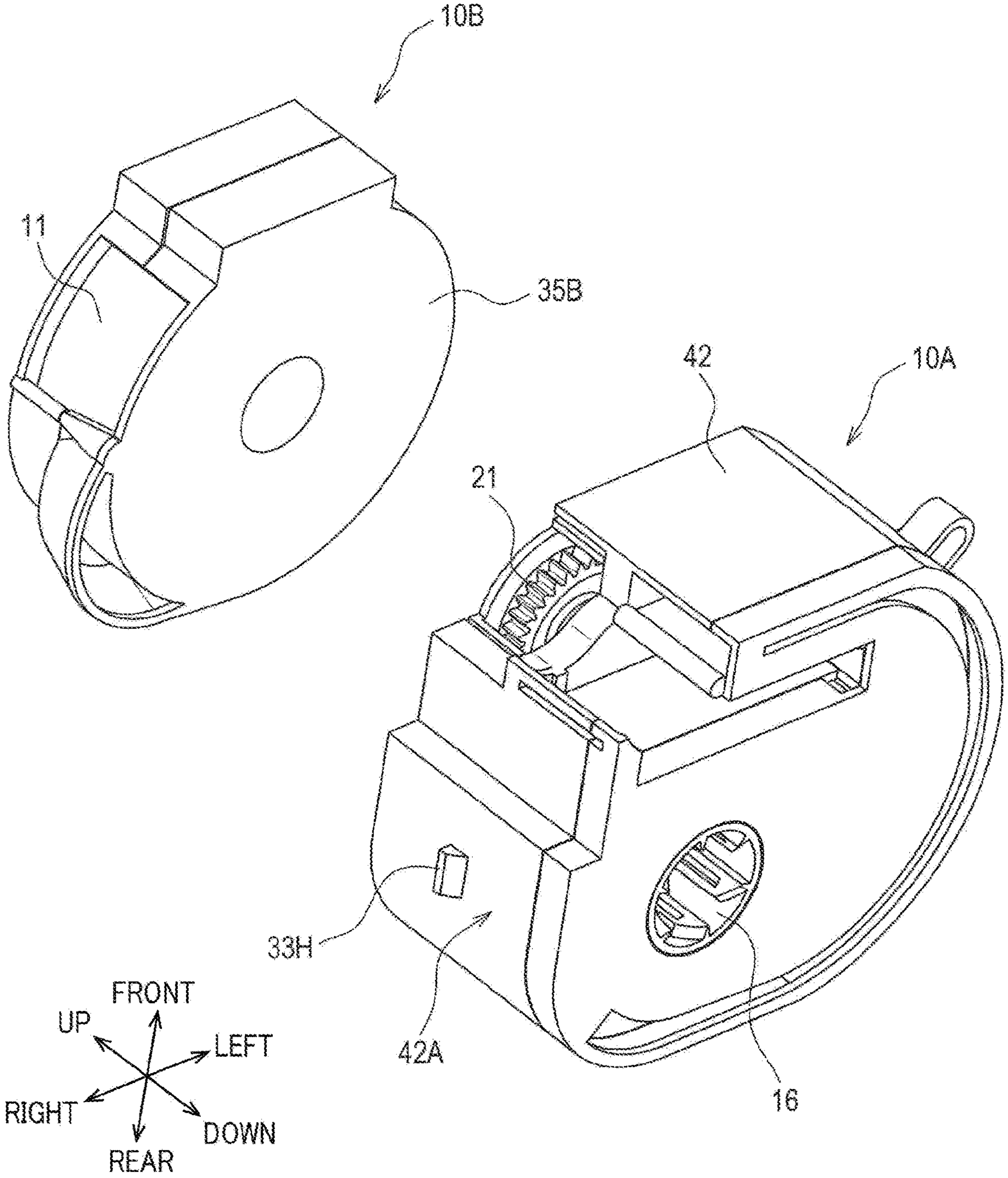
FIG. 11 is a schematic perspective view of a printing cassette according to another embodiment different from the embodiment of FIG. 2A

In place of the printing cassette 10 according to the first embodiment, a printing cassette 10A illustrated in FIG. 11 is attachable to the printer body 100 of FIGS. 1A and 1B.

The printing cassette 10A does not include the printing tape roll 11 and the roll case 41 in the printing cassette 10 according to the first embodiment. The printing cassette 10A is attachable to the cassette accommodating portion 101 in a state where the printing cassette 10A is coupled to a printing tape cassette 10B in the up-down direction.

The printing tape cassette 10B is a cassette for supplying the printing tape 11A to the printing cassette 10A. The printing tape cassette 10B includes the printing tape roll 11, and a roll case 35B accommodating the printing tape roll 11 therein. The printing tape 11A supplied from the printing tape cassette 10B is guided into the guide case 42 of the printing cassette 10A, and is conveyed toward the head opening 33B within the guide case 42.

Figure 12:
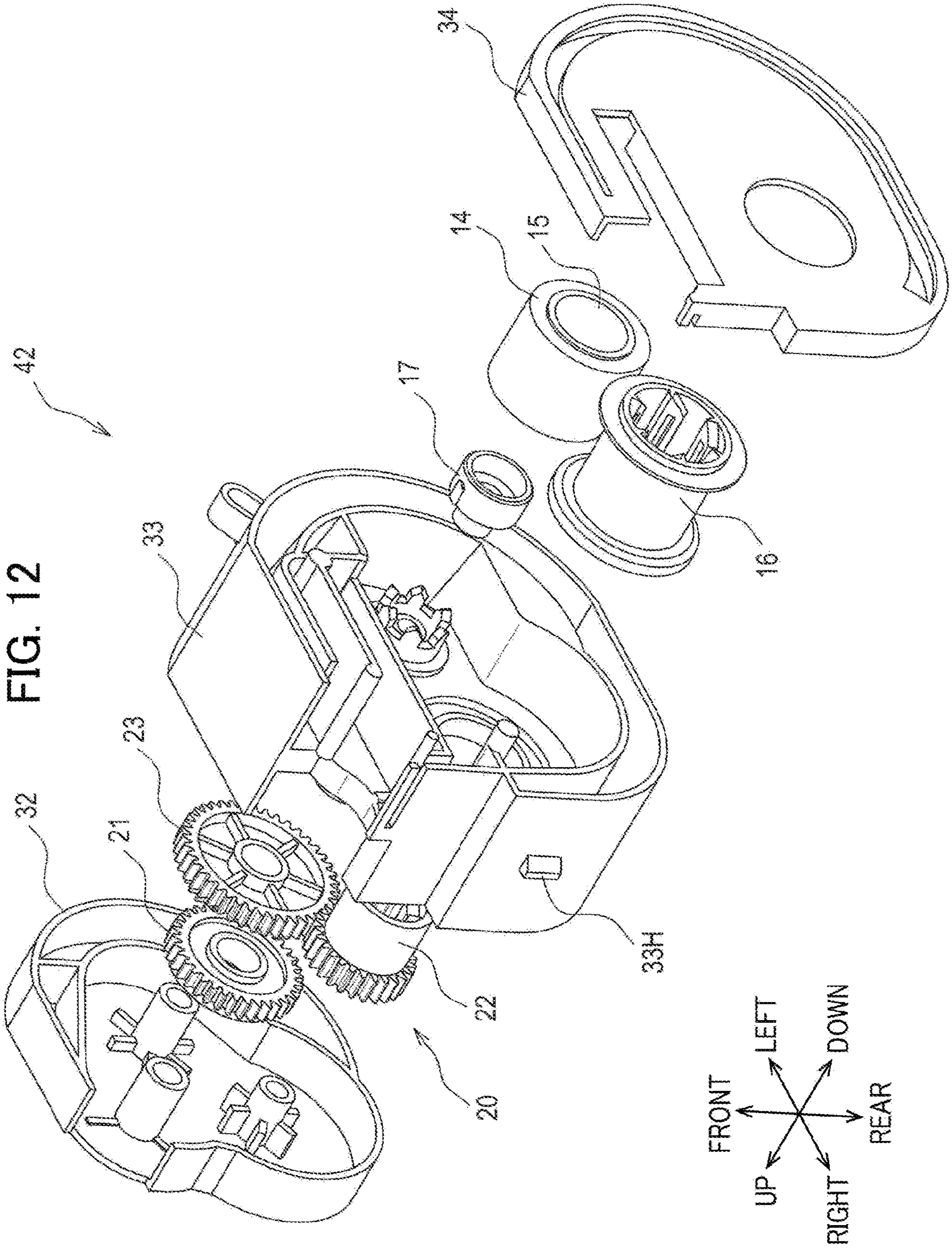
FIG. 12 is a schematic exploded perspective view of the printing cassette of FIG. 11.

As illustrated in FIG. 12, the printing cassette 10A includes the auxiliary tape roll 14, the second supply spool 15, the take-up spool 16, the clutch spring holder 17, the power transmission mechanism 20, the first frame part 32, the second frame part 33, and the second cover part 34.

These parts are the same as those of the printing cassette 10 according to the first embodiment. That is, similar to the first embodiment, the guide case 42 according to the second embodiment is constituted by the first frame part 32, the second frame part 33, and the second cover part 34.

Figure 13B:
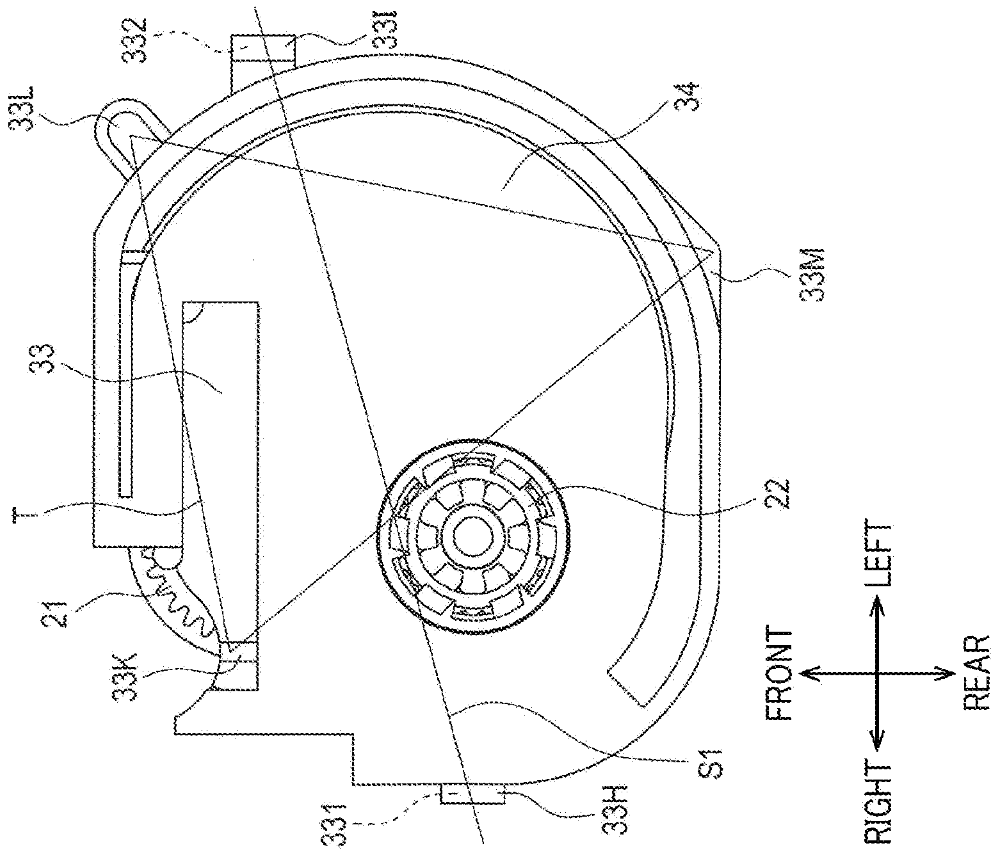
FIG. 13B is a schematic bottom view of the printing cassette of FIG. 11.
Figure 13A:
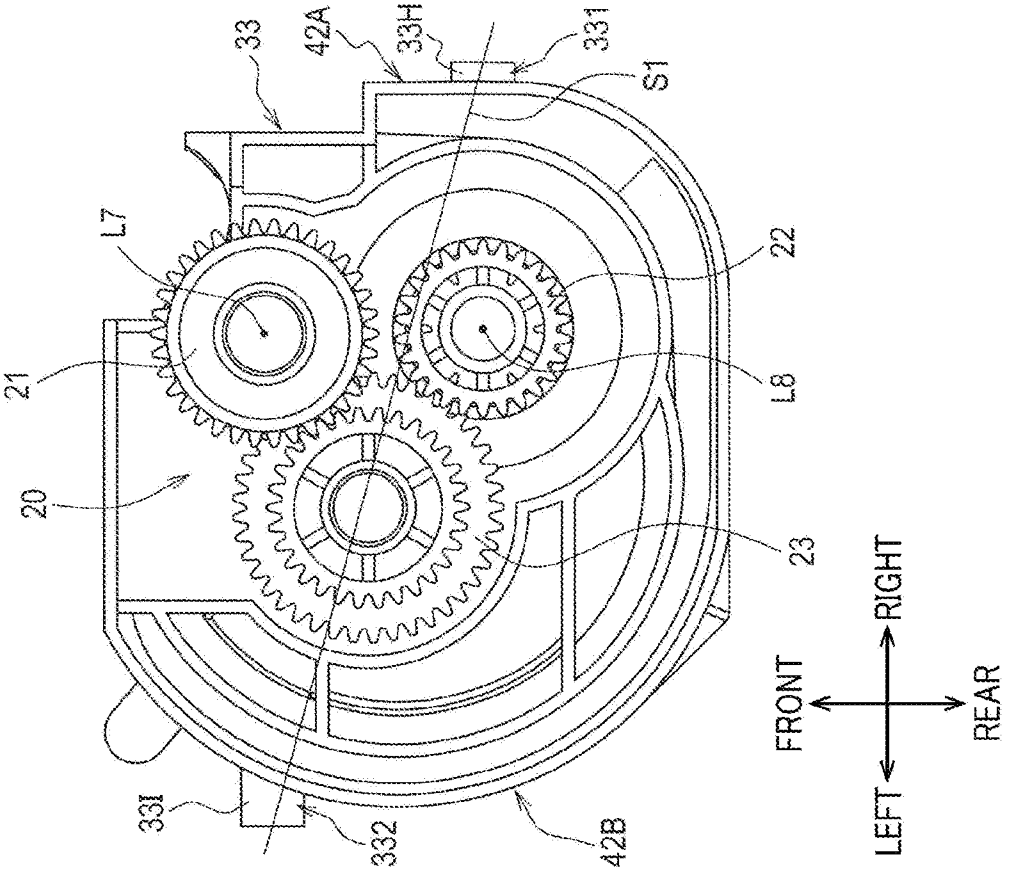
FIG. 13A is a schematic plan view of the printing cassette of FIG. 11A in a state where a first frame part is removed.

As illustrated in FIG. 13A, the second frame part 33 includes the first pawl 33H and the second pawl 33I which are the same as those of the first embodiment. The first pawl 33H extends from the first side surface 42A, and has the first engagement surface 331 engageable with the first engaging portion 101A. The second pawl 33I extends from the second side surface 42B, and has the second engagement surface 332 engageable with the second engaging portion 101B. The first side surface 42A and the second side surface 42B are arranged to interpose the power transmission mechanism 20 therebetween in the left-right direction.

In the printing cassette 10A, the first imaginary straight line S1 is defined, the first imaginary straight line S1 passing through the first engagement surface 331 and the second engagement surface 332 and being interposed between the rotation axis L8 of the input gear 22 and the rotation axis L7 of the output gear 21 as viewed in the up-down direction. Further, when viewed in the up-down direction, the first imaginary straight line S1 is overlapped with the power transmission mechanism 20 (specifically, the input gear 22 and the idle gear 23).

As illustrated in FIG. 13B, the second frame part 33 has the first abutment portion 33K, the second abutment portion 33L and the third abutment portion 33M which are the same as those of the first embodiment.

In the printing cassette 10A, the imaginary triangle T is defined. When viewed in the up-down direction, three vertexes of the imaginary triangle T are included respectively in the first abutment portion 33K, the second abutment portion 33L and the third abutment portion 33M, and the imaginary triangle T is overlapped with the first imaginary straight line S1.

[2-2] Technical Advantages

The following technical advantages can be obtained according to the above-described embodiment.

(2a) By selecting respectively the printing cassette 10A including the auxiliary tape roll 14 and the printing tape cassette 10B including the printing tape roll 11, the auxiliary tape (that is, the ink ribbon) and the printing tape can be arbitrarily combined.

3. OTHER EMBODIMENTS

While the embodiments according to the present disclosure have been described, it goes without saying that the present disclosure is not limited to the above-described embodiments and various configurations can be made thereto.

(3a) The printing device according to the above-described embodiments need not be such a device using an ink ribbon for printing. For example, the printing device may perform printing on a strip-like heat sensitive paper. That is, the printing cassette does not necessarily include an ink ribbon.

Further, the printing device may use, as a printing tape, a stencil tape which is to be perforated to form a printing pattern by a thermal head. In a case that the stencil tape is employed as the printing tape, a lined paper tape is used as the auxiliary tape in place of the ink ribbon for protecting the stencil tape.

(3b) The printing cassette according to the first embodiment may not include a roll case. That is, the printing tape roll is not necessarily accommodated in the case.

(3c) In the printing cassette according to the above-described embodiments, the guide case may not include the second engagement surface and the third engagement surface. Alternatively, the guide case may have four or more engagement surfaces.

(3d) In the printing cassette according to the above-described embodiments, the power transmission mechanism may be positioned above the printing tape roll or below the first engagement surface and the second engagement surface. Further, the input rotational part and the output rotational part may be constituted by a rotatable body other than a gear (such as, for example, a roller or a belt).

(3e) The function(s) exhibited by a single component in the above-described embodiments may be exhibited by a plurality of components in a sharing manner, or the function(s) exhibited by a plurality of components in the above-described embodiments may be exhibited by a single component in an integrated manner. Further, the component in the above-described embodiments may be partly omitted. Still further, at least a part of the structure of the above-described embodiments may be added to or replaced with other configuration(s) of the embodiments. Incidentally, each and every aspect encompassed by the technological concept specified by the recitation of the claims are within the meaning of the embodiment of the present disclosure.

What is claimed is:

1. A printing cassette attachable to a printer body including a cassette accommodating portion provided with a first engaging portion and a second engaging portion, the printing cassette comprising:
   a power transmission mechanism including an input rotational part and an output rotational part; and
   a guide case accommodating at least a part of the power transmission mechanism therein, the guide case having:
   a guide portion configured to guide a printing tape;
   a first side surface and a second side surface arranged to interpose the at least a part of the power transmission mechanism therebetween;
   a first engagement surface engageable with the first engaging portion; and
   a second engagement surface engageable with the second engaging portion,
   wherein the first engagement surface extends from the first side surface and crosses the first side surface,
   wherein the second engagement surface extends from the second side surface and crosses the second side surface, and
   wherein a first imaginary straight line is defined in the printing cassette, the first imaginary straight line passing through the first engagement surface and the second engagement surface and being interposed between a rotation axis of the input rotational part and a rotation axis of the output rotational part.

2. The printing cassette according to claim 1,
   wherein the input rotational part and the output rotational part are respectively gears.

3. The printing cassette according to claim 1,
   wherein the first engagement surface and the second engagement surface are positioned offset from the output rotational part on the same side as each other in a direction along the rotation axis of the output rotational part.

4. The printing cassette according to claim 3, further comprising a printing tape roll configured of the printing tape,
   wherein the printing tape roll is positioned opposite the first engagement surface and the second engagement surface with respect to the output rotational part in a direction parallel to the rotation axis of the output rotational part.

5. The printing cassette according to claim 4, further comprising an auxiliary tape roll configured of an auxiliary tape to be used for printing on the printing tape,
   wherein the auxiliary tape roll is positioned opposite the output rotational part with respect to the first engagement surface and the second engagement surface in the direction parallel to the rotation axis of the output rotational part.

6. The printing cassette according to claim 1,
   wherein the guide case further comprises a discharge portion through which the printing tape is to be discharged to an outside of the guide case, and
   wherein the first side surface faces the second side surface in a discharging direction of the printing tape at the discharge portion.

7. The printing cassette according to claim 1,
   wherein at least a part of the first engagement surface is at a position the same as a position of the second engagement surface in a direction parallel to the rotation axis of the input rotational part or in a direction parallel to the rotation axis of the output rotational part.

8. The printing cassette according to claim 1,
   wherein the cassette accommodating portion is further provided with a third engaging portion,
   wherein the guide case further has a third engagement surface engageable with the third engaging portion, and
   wherein the third engagement surface extends from the second side surface and crosses the second side surface.

9. The printing cassette according to claim 1, wherein the first engagement surface protrudes from the first side surface toward an outside of the guide case, and wherein the second engagement surface protrudes from the second side surface toward the outside of the guide case.

10. The printing cassette according to claim 1, wherein the first engagement surface and the second engagement surface face in a direction opposite a direction of insertion of the guide case into the cassette accommodating portion.

11. The printing cassette according to claim 10, wherein the first engagement surface and the second engagement surface are flat planes perpendicular to the direction of insertion.

12. The printing cassette according to claim 1, further comprising:

an auxiliary tape roll configured of an auxiliary tape to be used for printing on the printing tape; and a spool over which the auxiliary tape is to be wound, wherein the auxiliary tape roll and the spool are accommodated in the guide case, wherein the guide case comprises a wall section rotatably supporting the spool, and wherein at least a part of the first engagement surface and at least a part of the second engagement surface are at positions the same as a position of the wall section in a direction parallel to a center axis of the auxiliary tape roll.

13. A printing device comprising:

a printer body comprising a cassette accommodating portion provided with a first engaging portion and a second engaging portion; and the printing cassette according to claim 1.

14. A printing cassette attachable to a printer body including a cassette accommodating portion provided with a first engaging portion and a second engaging portion, the printing cassette comprising:

a power transmission mechanism including an input rotational part and an output rotational part; and a guide case accommodating at least a part of the power transmission mechanism therein, the guide case having:

a guide portion configured to guide a printing tape;

a first side surface and a second side surface arranged such that the at least a part of the power transmission mechanism is interposed between the first side surface and the second side surface;

a first engagement surface engageable with the first engaging portion; and a second engagement surface engageable with the second engaging portion, wherein the first engagement surface extends from the first side surface and crosses the first side surface, wherein the second engagement surface extends from the second side surface and crosses the second side surface, and wherein a first imaginary straight line is defined in the printing cassette, the first imaginary straight line passing through the first engagement surface and the second engagement surface and being overlapped with the power transmission mechanism as viewed in a first direction parallel to a rotation axis of the input rotational part or in a second direction parallel to a rotation axis of the output rotational part.

15. The printing cassette according to claim 14, wherein a second imaginary straight line is defined in the printing cassette, the second imaginary straight line passing through a geometric centroid of the first engagement surface and a geometric centroid of the second engagement surface and being overlapped with the power transmission mechanism as viewed in the first direction or in the second direction.

16. The printing cassette according to claim 14, wherein the input rotational part and the output rotational part are respectively gears.

17. The printing cassette according to claim 14, wherein the first engagement surface and the second engagement surface are positioned offset from the output rotational part on the same side as each other in a direction along the rotation axis of the output rotational part.

18. The printing cassette according to claim 17, further comprising a printing tape roll configured of the printing tape, wherein the printing tape roll is positioned opposite the first engagement surface and the second engagement surface with respect to the output rotational part in the second direction parallel to the rotation axis of the output rotational part.

19. The printing cassette according to claim 18, further comprising an auxiliary tape roll configured of an auxiliary tape to be used for printing on the printing tape, wherein the auxiliary tape roll is positioned opposite the output rotational part with respect to the first engagement surface and the second engagement surface in the second direction.

20. The printing cassette according to claim 14, wherein the guide case further comprises a discharge portion through which the printing tape is to be discharged to an outside of the guide case, and wherein the first side surface faces the second side surface in a discharging direction of the printing tape at the discharge portion.

21. The printing cassette according to claim 14, wherein at least a part of the first engagement surface is at a position the same as a position of the second engagement surface in the first direction or in the second direction.

22. The printing cassette according to claim 14, wherein the cassette accommodating portion is further provided with a third engaging portion, wherein the guide case further has a third engagement surface engageable with the third engaging portion, and wherein the third engagement surface extends from the second side surface and crosses the second side surface.

23. The printing cassette according to claim 14, wherein the first engagement surface protrudes from the first side surface toward an outside of the guide case, and wherein the second engagement surface protrudes from the second side surface toward the outside of the guide case.

24. The printing cassette according to claim 14, wherein the first engagement surface and the second engagement surface face in a direction opposite a direction of insertion of the guide case into the cassette accommodating portion.

25. The printing cassette according to claim 24, wherein the first engagement surface and the second engagement surface are flat planes perpendicular to the direction of insertion.

26. The printing cassette according to claim 14, further comprising:

an auxiliary tape roll configured of an auxiliary tape to be used for printing on the printing tape; and a spool over which the auxiliary tape is to be wound, wherein the auxiliary tape roll and the spool are accommodated in the guide case, wherein the guide case comprises a wall section rotatably supporting the spool, and wherein at least a part of the first engagement surface and at least a part of the second engagement surface are at positions the same as a position of the wall section in a direction parallel to a center axis of the auxiliary tape roll.

27. A printing device comprising:

a printer body comprising a cassette accommodating portion provided with a first engaging portion and a second engaging portion; and the printing cassette according to claim 14.

* * * * *